(12) United States Patent
Lee et al.

(10) Patent No.: US 8,406,259 B2
(45) Date of Patent: Mar. 26, 2013

(54) TIME DIVISION MULTIPLEXING COMMUNICATION SYSTEM WITH PARALLEL STRUCTURE AND METHOD FOR THE SAME

(75) Inventors: Woo Yong Lee, Daejeon (KR); Kyeongpyo Kim, Daejeon (KR); Jin Kyeong Kim, Daejeon (KR); Yong Sun Kim, Daejeon (KR); Hyoung Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 511 days.

(21) Appl. No.: 12/672,735

(22) PCT Filed: Aug. 8, 2008

(86) PCT No.: PCT/KR2008/004615
§ 371 (c)(1),
(2), (4) Date: Feb. 9, 2010

(87) PCT Pub. No.: WO2009/022817
PCT Pub. Date: Feb. 19, 2009

(65) Prior Publication Data
US 2011/0032953 A1 Feb. 10, 2011

(30) Foreign Application Priority Data

Aug. 10, 2007 (KR) .................. 10-2007-0080898
Aug. 1, 2008 (KR) .................. 10-2008-0075658

(51) Int. Cl.
*H04J 3/04* (2006.01)

(52) U.S. Cl. ........ 370/535; 370/203; 370/329; 370/366; 370/390; 375/261

(58) Field of Classification Search .......... 370/203–210, 370/320, 329–330, 334–335, 390, 366, 441, 370/437; 375/260, 267, 299, 152, 144, 148, 375/222, 347; 455/102, 130, 447, 277.1, 455/456.1, 140, 101; 398/79, 147, 98; 714/727
See application file for complete search history.

(56) References Cited

U.S. PATENT DOCUMENTS 5,243,629 A * 9/1993 Wei .............................. 375/299
5,287,351 A * 2/1994 Wall, Jr. ........................ 370/206
(Continued)

FOREIGN PATENT DOCUMENTS

KR 19990040881 A 6/1999
KR 20050019265 A 3/2005

OTHER PUBLICATIONS

Tsie et al, Concatenated trellis-coded 8-ary psk for land mobile satelite communications, 1992.*

(Continued)

*Primary Examiner* — Michael Thier
*Assistant Examiner* — Vincelas Louis
(74) *Attorney, Agent, or Firm* — Ladas & Parry LLP

(57) ABSTRACT

Disclosed are a Time Division Multiplexing (TDM) communication system with a parallel structure and a method for the same. A transmission apparatus of the TDM communication system with the parallel structure includes a Time Division Demultiplexer (TDDM) to perform time division demultiplexing of inputted first serial signals to thereby output the demultiplexed serial signals as a plurality of parallel signals, a plurality of modulators to respectively modulate the outputted parallel signals; a Time Division Multiplexer (TDM) to adjust a multiplexing ratio according to channel-related information, and to perform time division multiplexing of each of the modulated parallel signals in the adjusted multiplexing ratio to thereby output the multiplexed parallel signals as second serial signals, and a transmission antenna to transmit the outputted second serial signals.

10 Claims, 14 Drawing Sheets

U.S. PATENT DOCUMENTS

| | | | | |
|---|---|---|---|---|
| 5,400,163 A * | 3/1995 | Mizuochi et al. | | 398/79 |
| 5,442,625 A * | 8/1995 | Gitlin et al. | | 370/342 |
| 5,566,164 A * | 10/1996 | Ohlson | | 370/320 |
| 5,844,907 A * | 12/1998 | Uchiki et al. | | 370/517 |
| 5,856,971 A * | 1/1999 | Gitlin et al. | | 370/335 |
| 6,127,971 A * | 10/2000 | Calderbank et al. | | 342/368 |
| 6,205,169 B1 * | 3/2001 | Nakamura | | 375/152 |
| 6,351,499 B1 * | 2/2002 | Paulraj et al. | | 375/267 |
| 6,728,298 B1 * | 4/2004 | Okubo et al. | | 375/146 |
| 6,813,253 B1 * | 11/2004 | Yamaguchi | | 370/330 |
| 6,944,233 B2 * | 9/2005 | Zhang et al. | | 375/261 |
| 6,985,544 B2 * | 1/2006 | Matsui et al. | | 375/347 |
| 7,092,431 B2 * | 8/2006 | Maeda et al. | | 375/144 |
| 7,110,677 B2 * | 9/2006 | Reingand et al. | | 398/98 |
| 7,133,425 B2 * | 11/2006 | McClellan | | 370/535 |
| 7,154,960 B2 * | 12/2006 | Liu et al. | | 375/267 |
| 7,215,635 B2 * | 5/2007 | Song et al. | | 370/208 |
| 7,310,503 B2 * | 12/2007 | Ido | | 455/140 |
| 7,366,228 B2 * | 4/2008 | Minowa et al. | | 375/149 |
| 7,391,715 B2 * | 6/2008 | Lee et al. | | 370/208 |
| 7,406,067 B2 * | 7/2008 | Deng et al. | | 370/335 |
| 7,430,243 B2 * | 9/2008 | Giannakis et al. | | 375/267 |
| 7,596,133 B2 * | 9/2009 | Shin et al. | | 370/366 |
| 7,813,441 B2 * | 10/2010 | Jalali et al. | | 375/267 |
| 7,856,216 B2 * | 12/2010 | Ichihara | | 455/134 |
| 7,970,048 B2 * | 6/2011 | Damen et al. | | 375/240 |
| 7,974,359 B2 * | 7/2011 | Gorokhov et al. | | 375/267 |
| 7,983,217 B2 * | 7/2011 | Alamouti et al. | | 370/330 |
| 7,983,236 B2 * | 7/2011 | Rinne et al. | | 370/342 |
| 7,983,352 B2 * | 7/2011 | Li et al. | | 375/267 |
| 8,019,288 B2 * | 9/2011 | Yu et al. | | 455/69 |
| 8,045,935 B2 * | 10/2011 | Lakkis et al. | | 455/91 |
| 8,107,544 B2 * | 1/2012 | Mondal et al. | | 375/260 |
| 8,107,556 B2 * | 1/2012 | Aoki et al. | | 375/299 |
| 8,155,229 B2 * | 4/2012 | Lee et al. | | 375/267 |
| 8,184,726 B2 * | 5/2012 | Hsiao et al. | | 375/260 |
| 8,194,776 B2 * | 6/2012 | Jalali et al. | | 375/267 |
| 2001/0017866 A1 * | 8/2001 | Takada et al. | | 370/535 |
| 2001/0050963 A1 * | 12/2001 | Yoneyama | | 375/267 |
| 2002/0003813 A1 * | 1/2002 | Marko | | 370/477 |
| 2002/0122383 A1 * | 9/2002 | Wu et al. | | 370/210 |
| 2003/0021271 A1 * | 1/2003 | Leimer et al. | | 370/390 |
| 2003/0031195 A1 * | 2/2003 | Okawa et al. | | 370/441 |
| 2003/0058499 A1 * | 3/2003 | Reingand et al. | | 359/135 |
| 2003/0123530 A1 * | 7/2003 | Maeda et al. | | 375/148 |
| 2003/0123565 A1 * | 7/2003 | Fukuda et al. | | 375/267 |
| 2003/0138031 A1 * | 7/2003 | Okubo et al. | | 375/144 |
| 2004/0008737 A1 * | 1/2004 | McClellan | | 370/535 |
| 2004/0082303 A1 * | 4/2004 | Giannakis et al. | | 455/130 |
| 2004/0085919 A1 * | 5/2004 | Song et al. | | 370/320 |
| 2004/0136465 A1 * | 7/2004 | Hwang et al. | | 375/267 |
| 2004/0141481 A1 * | 7/2004 | Lee et al. | | 370/335 |
| 2004/0190515 A1 | 9/2004 | Nogima et al. | | |
| 2005/0036519 A1 * | 2/2005 | Balakrishnan et al. | | 370/503 |
| 2005/0047514 A1 * | 3/2005 | Bolinth et al. | | 375/261 |
| 2005/0047791 A1 * | 3/2005 | Miyazaki | | 398/147 |
| 2005/0055617 A1 * | 3/2005 | Wang et al. | | 714/727 |
| 2005/0068918 A1 * | 3/2005 | Mantravadi et al. | | 370/328 |
| 2005/0135322 A1 * | 6/2005 | Lim et al. | | 370/342 |
| 2005/0175116 A1 * | 8/2005 | Feher | | 375/267 |
| 2005/0201473 A1 * | 9/2005 | Lakkis | | 375/260 |
| 2005/0233710 A1 * | 10/2005 | Lakkis et al. | | 455/102 |
| 2005/0286619 A1 * | 12/2005 | Haddadin et al. | | 375/222 |
| 2006/0014542 A1 * | 1/2006 | Khandekar et al. | | 455/447 |
| 2006/0023667 A1 * | 2/2006 | Tanabe et al. | | 370/334 |
| 2006/0034385 A1 * | 2/2006 | Egashira et al. | | 375/267 |
| 2006/0045200 A1 * | 3/2006 | Bocquet | | 375/267 |
| 2006/0140304 A1 * | 6/2006 | Li et al. | | 375/299 |
| 2006/0166634 A1 * | 7/2006 | Ido | | 455/277.1 |
| 2006/0209764 A1 * | 9/2006 | Kim et al. | | 370/334 |
| 2006/0251149 A1 * | 11/2006 | Fujii | | 375/146 |
| 2006/0269009 A1 * | 11/2006 | Krishnan et al. | | 375/260 |
| 2006/0274710 A1 * | 12/2006 | Lim et al. | | 370/342 |
| 2006/0280206 A1 * | 12/2006 | Marko | | 370/477 |
| 2007/0064831 A1 * | 3/2007 | Bjerke et al. | | 375/267 |
| 2007/0070944 A1 * | 3/2007 | Rinne et al. | | 370/329 |
| 2007/0076587 A1 * | 4/2007 | Kwon et al. | | 370/208 |
| 2007/0127586 A1 * | 6/2007 | Hafeez | | 375/267 |
| 2007/0127593 A1 * | 6/2007 | Lee et al. | | 375/299 |
| 2007/0184849 A1 * | 8/2007 | Zheng | | 455/456.1 |
| 2007/0206626 A1 * | 9/2007 | Lee et al. | | 370/437 |
| 2007/0223618 A1 * | 9/2007 | Jeong et al. | | 375/267 |
| 2008/0080594 A1 * | 4/2008 | Naguib | | 375/144 |
| 2008/0107202 A1 * | 5/2008 | Lee et al. | | 375/267 |
| 2008/0181617 A1 * | 7/2008 | Ann | | 398/158 |
| 2010/0020757 A1 * | 1/2010 | Walton et al. | | 370/329 |
| 2010/0021166 A1 * | 1/2010 | Way | | 398/79 |
| 2010/0208832 A1 * | 8/2010 | Lee et al. | | 375/260 |
| 2010/0220708 A1 * | 9/2010 | Mantravadi et al. | | 370/343 |
| 2012/0120875 A1 * | 5/2012 | Yano et al. | | 370/328 |
| 2012/0163328 A1 * | 6/2012 | Sivaswamy et al. | | 370/329 |

OTHER PUBLICATIONS

Ishwar et al, On the diversity multiplexing region of broadcast channels with partial channel state information, 2006.*

International Search Report: PCT/KR2008/004615, Dec. 24, 2008.

* cited by examiner

TIME DIVISION MULTIPLEXING COMMUNICATION SYSTEM WITH PARALLEL STRUCTURE AND METHOD FOR THE SAME

TECHNICAL FIELD

The present invention relates to a communication system and a method for the same, and more particularly, a time division multiplexing communication system with a parallel structure and a method for the same.

This work was supported by the IT R&D program of MIC/IITA. [2007-S-002-01, Development of Multi-Gigabit Air Interface Technology]

BACKGROUND ART

Currently, an Orthogonal Frequency Division Multiplexing (OFDM) scheme or an Orthogonal Frequency Division Multiple Access (OFDMA) scheme known as useful schemes for high-speed data transmission in wired/wireless channels may transmit data using a plurality of carriers, and more specifically, may convert data inputted in serial into data in parallel, modulate the converted data into a plurality of sub-carriers having mutual orthogonality with respect to each of the converted data, that is, sub-channels, and transmit the modulated data.

The above-mentioned OFDM scheme may transmit data while maintaining orthogonality between the plurality of sub-carriers, and thus obtaining optimum transmission efficiency at the time of high-speed data transmission, and also obtaining multi-path fading tolerance characteristics and superior frequency efficiency.

Also, the OFDM scheme may superimpose one frequency spectrum over another, and thus reducing interference effects between symbols using a guard zone tolerating frequency selective fading, simply designing a structure of an equalizer in hardware, and tolerating impulse noise.

However, a conventional OFDM system having a single flow type structure may change a magnitude of a fast Fourier transform (FFT) to adjust a transmission speed, or a conventional OFDM system having a parallel flow type structure may parallelize only partially encoded and decoded parts or a Radio Frequency (RF) front-end, each which results in reduction in an operation speed of all hardware in a high speed system.

DISCLOSURE OF INVENTION

Technical Goals

An aspect of the present invention provides a time division multiplexing communication system and a method for the same in which a number of parallel streams may be variably adjusted according to channel related-information such as a channel state, a frequency bandwidth, a transmission rate, a Signal-to-Noise Ratio (SNR), and the like in a high-speed radio communication system, so that an internal operation speed of the system, thereby increasing an amount of data that can be processed simultaneously.

An aspect of the present invention provides a time division multiplexing communication system and a method for the same in which a multiplexing ratio is reduced simultaneously in a case of applications requiring a low transmission rate, so that an amount of data that can be processed is reduced, thereby reducing power consumed in the system.

An aspect of the present invention provides a time division multiplexing communication system and a method for the same in which a frequency bandwidth is reduced by reducing a multiplexing ratio in a case of a poor channel state, so that data is transmitted while avoiding bands where a deep fading from among assigned frequency bands exists, thereby increasing efficiency and reliability of the communication.

An aspect of the present invention provides a time division multiplexing communication system and a method for the same which may be applicable in an Orthogonal Frequency Division Multiplexing (OFDM) system, thereby reducing a Peak to Average Power Ratio (PAPR).

An aspect of the present invention provides a time division multiplexing communication system and a method for the same in which Bit Error Rate (BER) performance is improved through a time diversity gain, and a transmission distance is enlarged.

Technical Solutions

According to an aspect of the present invention, there is provided a transmission apparatus of a Time Division Multiplexing communication system with a parallel structure, the transmission apparatus including: a Time Division Demultiplexer (TDDM) to perform time division demultiplexing of inputted first serial signals to thereby output the demultiplexed serial signals as a plurality of parallel signals; a plurality of modulators to respectively modulate the outputted parallel signals; a Time Division Multiplexer (TDM) to adjust a multiplexing ratio according to channel-related information, and to perform time division multiplexing of each of the modulated parallel signals in the adjusted multiplexing ratio to thereby output the multiplexed parallel signals as second serial signals; and a transmission antenna to transmit the outputted second serial signals.

In this instance, the TDM may adjust a time diversity gain according to the channel-related information, and adjust the multiplexing ratio according to the adjusted time diversity gain.

Also, the TDM may compare a time diversity gain with a maximum time diversity gain when the time diversity gain is requested from a receiving apparatus, determine a number of the parallel signals to correspond to the maximum time diversity gain based on the compared result, and perform time division multiplexing of the determined number of parallel signals.

Also, when assignment of the transmission rate or bandwidth is requested from a receiving apparatus, the TDM may compare, with a maximum transmission ratio, a transmission ratio of the requested transmission rate to another transmission rate for each of the parallel signals, determine a number of the parallel signals to correspond to the transmission ratio based on the compared result, and perform time division multiplexing of the determined number of parallel signals.

Also, when assignment of the transmission rate or bandwidth and time diversity gains are requested from a receiving apparatus, the TDM may compare, with a maximum time diversity gain, the sum of a transmission ratio of the requested transmission rate to another transmission rate for each of the parallel signals and the requested time diversity, determine a number of the parallel signals to correspond to the maximum time diversity gain based on the compared result, and perform time division multiplexing of the determined number of parallel signals.

According to an aspect of the present invention, there is provided a receiving apparatus of a Time Division Multiplexing communication system with a parallel structure, the receiving apparatus including: a receiving antenna to receive second serial signals from a transmission apparatus; a Time Division Demultiplexer (TDDM) to perform time division demultiplexing of the received second serial signals in a demultiplexing ratio corresponding to a multiplexing ratio of the transmission apparatus to thereby output the demultiplexed serial signals as a plurality of parallel signals; a plurality of demodulators to respectively demodulate the outputted parallel signals; and a Time Division Multiplexer (TDM) to perform time division multiplexing of each of the demodulated parallel signals to thereby restore the multiplexed parallel signals as a first serial signal.

According to an aspect of the present invention, there is provided a time division multiplexing communication system with a parallel structure, the system including: a transmission apparatus and a receiving apparatus.

In this instance, the transmission apparatus may perform time division demultiplexing of inputted first serial signals to thereby output the demultiplexed serial signals as a plurality of parallel signals, perform time division multiplexing of each of the outputted parallel signals in a multiplexing ratio depending on channel related-information to thereby output the multiplexed parallel signals as second serial signals, and transmit the outputted second serial signals. Also, the receiving apparatus may receive the second serial signals from the transmission apparatus, perform time division demultiplexing of each of the received second serial signals in a demultiplexing ratio corresponding to the multiplexing ratio of the transmission apparatus to thereby output the demultiplexed serial signals as a plurality of parallel signals, and perform time division multiplexing of each of the outputted parallels signals to thereby restore the multiplexed parallel signals as the first serial signals.

Also, the transmission apparatus may adjust a time diversity gain according to the channel-related information, and adjust the multiplexing ratio according to the adjusted time diversity gain.

According to an aspect of the present invention, there is provided a transmission method of a time division multiplexing communication system with a parallel structure, the transmission method including: performing time division demultiplexing of inputted first serial signals to thereby output the demultiplexed serial signals as a plurality of parallel signals; modulating each of the outputted parallel signals; adjusting a multiplexing ratio according to a channel state and a frequency bandwidth, and performing time division multiplexing of each of the plurality of the demodulated parallel signals to thereby output the multiplexed parallel signals as second serial signals; and transmitting the outputted second serial signals.

In this instance, the performing of the time division multiplexing may include adjusting a time diversity gain according to channel related information; and adjusting the multiplexing ratio according to the adjusted time diversity gain.

Also, the performing of the time division multiplexing may include: comparing a time diversity gain with a maximum time diversity gain when the time diversity gain is requested from a receiving apparatus; determining a number of the parallel signals to correspond to the maximum time diversity gain based on the compared result; and performing time division multiplexing of the determined number of parallel signals.

Also, the performing of the time division multiplexing may include: comparing, with a maximum transmission ratio, a transmission ratio of a transmission rate to another transmission rate for each of the parallel signals when assignment of the transmission rate or bandwidth is requested from a receiving apparatus; determining a number of the parallel signals to correspond to the transmission rate based on the compared result; and performing time division multiplexing of the determined number of parallel signals.

Also, the performing of the time division multiplexing may include: comparing, with a maximum time diversity gain, the sum of a transmission ratio of a transmission rate to another transmission rate for each of the parallel signals and time diversity gain when assignment of the transmission rate or bandwidth, and the time diversity gain are requested from a receiving apparatus; determining a number of the parallel signals to correspond to the maximum time diversity gain based on the compared result; and performing time division multiplexing of the determined number of parallel signals.

According to an aspect of the present invention, there is provided a receiving method of a time division multiplexing communication system with a parallel structure, the receiving method including: receiving second serial signals from a transmission apparatus; performing time division demultiplexing of the received second serial signals in a demultiplexing ratio corresponding to a multiplexing ratio of the transmission apparatus to thereby output the demultiplexed serial signals as a plurality of parallel signals; respectively demodulating the outputted parallel signals; and performing time division multiplexing of each of the demodulated parallel signals as first serial signals.

Advantageous Effects

As described above, according to the present invention, a number of parallel streams may be variably adjusted according to channel related-information such as a channel state, a frequency bandwidth, a transmission rate, a Signal-to-Noise Ratio (SNR), and the like in a high-speed radio communication system, so that an internal operation speed of the system, thereby increasing an amount of data that can be processed simultaneously.

According to the present invention, a multiplexing ratio is reduced simultaneously in a case of applications requiring a low transmission rate, so that an amount of data that can be processed is reduced, thereby reducing power consumed in the system.

According to the present invention, a frequency bandwidth is reduced by reducing a multiplexing ratio in a case of poor channel state, so that data is transmitted while avoiding bands where a deep fading from among assigned frequency bands exists, thereby increasing efficiency and reliability of the communication.

According to the present invention, the present invention is applicable in an Orthogonal Frequency Division Multiplexing (OFDM) system, thereby reducing a Peak to Average Power Ratio (PAPR).

According to the present invention, Bit Error Rate (BER) performance is improved through a time diversity gain, and a transmission distance is enlarged.

BEST MODE FOR CARRYING OUT THE INVENTION

Figure 1:
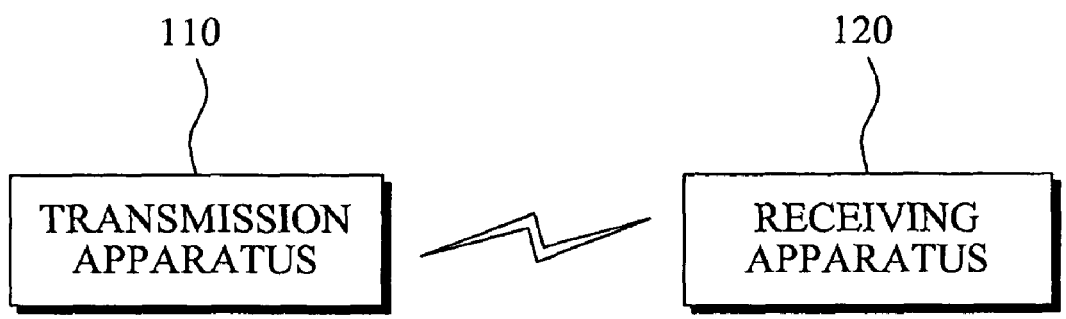
FIG. 1 is a block diagram illustrating a time division multiplexing communication system with a parallel structure according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a time division multiplexing communication system with a parallel structure according to an exemplary embodiment of the present invention.

Referring to FIG. 1, the time division multiplexing communication system may include a transmission apparatus 110 and a receiving apparatus 120.

The transmission apparatus 110 performs time division demultiplexing of inputted first serial signals to thereby output the demulitplexed signals as a plurality of parallel signals, and performs time division multiplexing of each of the outputted parallel signals in a multiplexing ratio according to channel related information to thereby output the multiplexed parallel signals as second serial signals. Also, the transmission apparatus 110 may transmit the outputted second serial signals to the receiving apparatus 120.

The receiving apparatus 120 may receive the second serial signals from the transmission apparatus 110k, and perform time division demultiplexing of the received second serial signals in a demultiplexing ratio corresponding to a multiplexing ratio of the transmission apparatus to thereby output the demultiplexed serial signals as a plurality of parallel signals. Also, the receiving apparatus 120 may perform time division multiplexing of each of the outputted parallel signals to thereby restore the multiplexed parallel signals as first serial signals.

Figure 2:
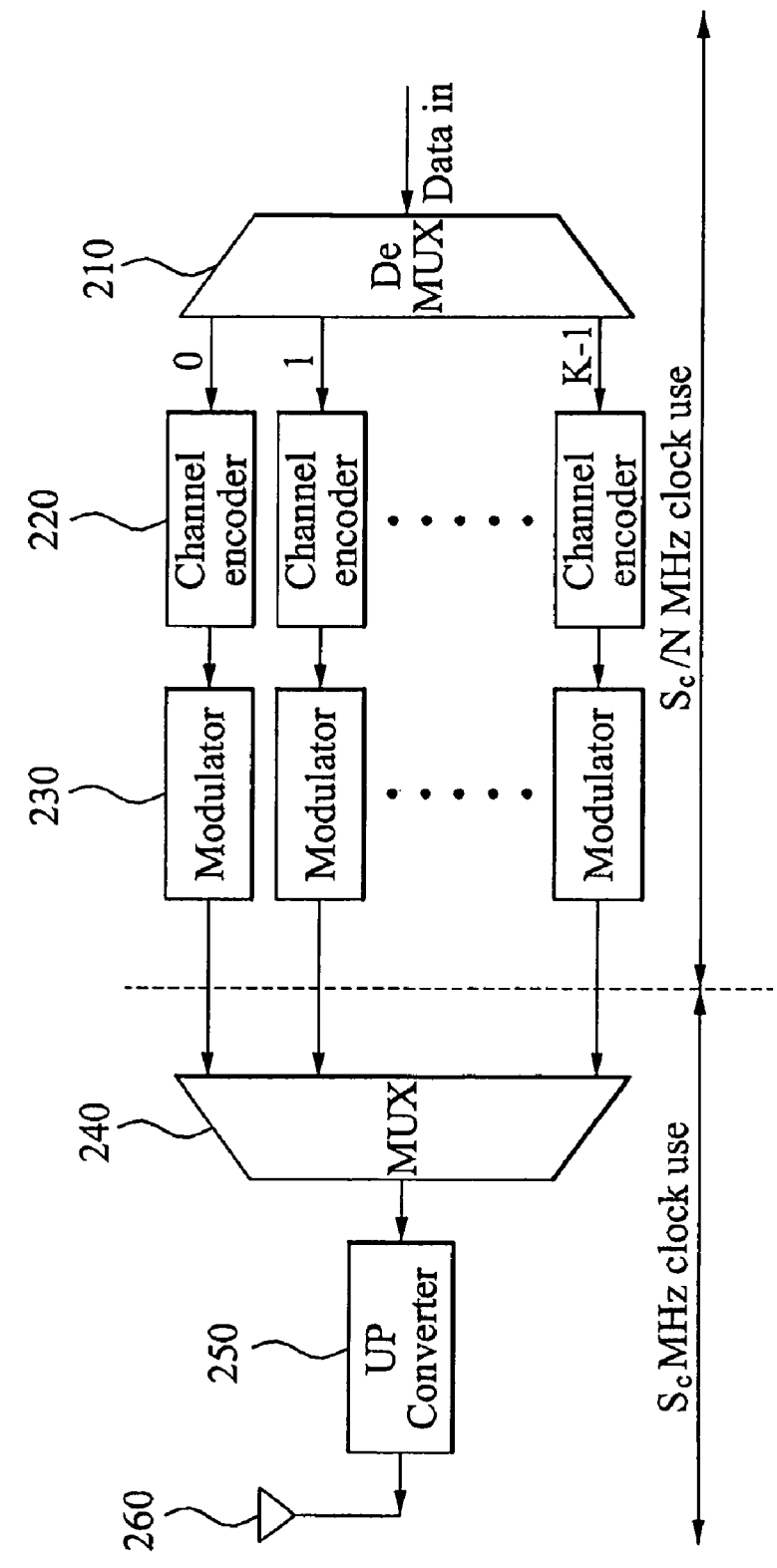
FIG. 2 is a block diagram illustrating a transmission apparatus of a time division multiplexing communication system with a parallel structure according to an exemplary embodiment of the present invention.

FIG. 2 is a block diagram illustrating a transmission apparatus of a time division multiplexing communication system with a parallel structure according to an exemplary embodiment of the present invention.

Referring to FIGS. 1 and 2, the transmission apparatus 110 may include a Time Division DeMultiplexer (TDDM) 210, a plurality of channel encoders 220, a plurality of modulators 230, a Time Division Multiplexer (TDM) 240, an upconverter 250, and a transmission antenna 260.

The TDDM 210 may receive an input of first serial signals, and perform time division demultiplexing of the inputted first serial signals to thereby output the demultiplexed serial signals as a plurality of parallel signals. Specifically, the TDDM 210 may parallelize the first serial signals received in serial and divide by space to thereby output as a plurality of parallel signals.

The plurality of channel encoders 220 may respectively encode the outputted parallel signals. Specifically, the plurality of channel encoders 220 may convert each of the outputted parallel signals into digital signals to output.

The plurality of modulators 230 may modulate each of the encoded parallel signals. In this instance, the plurality of modulators 230 may modulate each of the encoded parallel signals according to a determined modulation scheme. The modulation scheme may include a Frequency Shift Keying (FSK), Amplitude Shift Keying (ASK), Phase Shift Keying (PSK), Quadrature Amplitude Modulation (QAM), and the like.

The TDM 240 may adjust a number of parallel flows depending on channel related-information, for example, channel states (transmitting/receiving) of the transmission apparatus 110 or receiving apparatus 120, a frequency bandwidth, a transmission rate, a Signal-to-Noise Ratio (SNR), user's requests, and the like.

Also, the TDM 240 may perform time division multiplexing of each of the modulated parallel signals in the adjusted multiplexing ratio to thereby output the multiplexed parallel signals as second serial signals. Specifically, the TDM 240 may perform time division multiplexing of the adjusted number of parallel flow (parallel signals) in a multiplexing ratio adjusted according to the channel related information to thereby output the multiplexed parallel signals as the second serial signals.

Specifically, the TDM 240 may adjust a time diversity gain according to the channel related-information, and adjust the multiplexing ratio according to the adjusted time diversity gain. Thus, the TDM 240 may increase an amount of data that can be processed simultaneously by increasing the multiplexing ratio in a case of the receiving apparatus 120 requesting a high transmission rate, and reduce the amount of data by reducing the multiplexing ratio in a case of the receiving apparatus 120 requesting a low transmission rate.

More specifically, the TDM 240 may perform time division multiplexing of each of the modulated parallel signals based on the multiplexing ratio depending on the channel related-information, thereby variably adjusting the transmission rate.

For example, the TDM 240 may reduce a frequency bandwidth by reducing the multiplexing ratio in a case of poor channel state, thereby transmitting data while avoiding a band where deep fading exists from among assigned frequency bands. As a result, the TDM 240 may increase efficiency and reliability of communication.

Therefore, the TDM 240 may adjust an amount of data transmission according to a request transmission rate from the receiving apparatus 120, thereby adjusting power consumption. Also, the TDM 240 may adjust the frequency bandwidth by adjusting the multiplexing ratio according to a channel state, thereby effectively using the frequency band, and enabling reliable communication to be performed.

Hereinafter, a process for adjusting the time diversity gain will be described in detail. The process for the time diversity gain may be divided into a case of being requested from the receiving apparatus 120, and a case of being requested assignment of the transmission rate or a bandwidth.

In the case where the time diversity gain is requested from the receiving apparatus 120, the TDM 240 may compare the requested time diversity gain with a maximum time diversity gain. Also, the TDM 240 may determine a number of the parallels signals to correspond to the maximum time diversity gain based on the compared result, and perform time division multiplexing the determined number of parallel signals.

Specifically, the TDM 240 may compare a time diversity gain $G_t$ and a maximum time diversity gain K when the time diversity gain $G_t$ is requested from the receiving apparatus 120. According to the compared result, when the time diversity gain $G_t$ is greater than the maximum time diversity gain K, the TDM 240 may output a failure message with respect to the diversity gain request, and the transmission antenna 260 may transmit the outputted failure message to the receiving apparatus 120. As a result, the transmission apparatus 110 may terminate a response procedure with respect to the diversity request of the receiving apparatus 120.

Conversely, according to the compared result, when the time diversity gain $G_t$ is smaller than the maximum time diversity gain K, the TDM 240 may determine a sub-stream of $MG_t (\leq K)$ and $K-MG_t$ number of the remaining sub-streams, so that a number of sub-streams (parallel signals) satisfying the time diversity gain $G_t$ is $M(=1 \sim K)$. Accordingly, the TDM 240 may determine the number of sub-streams as K, and perform time division multiplexing of the determined K number of sub-streams to thereby output the multiplexed sub-streams (parallel signals) as the second serial signals.

Also, when M number of time diversity gains $\{G_t^0, G_t^1, \ldots, G_t^{M-1}\}$ with respect to M number of sub-streams (parallel signals) are requested from the receiving apparatus 120, the TDM 240 may compare a sum of the request time diversity gains $$G_t \left( = \sum_{m=0}^{M-1} G_t^m \right)$$

and the maximum time diversity gain K. According to the compared result, when the sum of the request time diversity gains $$G_t \left( = \sum_{m=0}^{M-1} G_t^m \right)$$

is greater than the maximum time diversity gain K, the TDM 240 may output a failure message for the diversity gain request, and the transmission antenna 260 may transmit the outputted failure message to the receiving apparatus 120. As a result, the transmission apparatus 110 may terminate a response procedure with respect to the diversity request of the receiving apparatus 120.

Conversely, according to the compared result, when the sum of the requested time diversity gains $$G_t \left( = \sum_{m=0}^{M-1} G_t^m \right)$$

is smaller than or equal to the maximum time diversity gain K, the TDM 240 may determine $M(=1 \sim K)$ number of sub-streams satisfying a requested time diversity gain $G_t$, and $K-G_t$ number of the remaining sub-streams. Thus, the TDM 240 may determine K number of sub-streams (parallel signals), and perform time division multiplexing of the determined K number of sub-streams to thereby output the second serial signals.

Also, when assignment of a transmission rate (or bandwidth) is requested from the receiving apparatus 120, the TDM 240 may compare, with a maximum transmission ratio, a transmission ratio of the requested transmission rate to a transmission rate for each of the parallel signals. Also, the TDM 240 may determine the number of parallel signals to correspond to the transmission ratio based on the compared result, and perform time division multiplexing of the determined number of parallel signals.

Specifically, in a case where the transmission rate (or bandwidth) for each of the sub-streams (parallel signals) is $W_{1B}$, the TDM 240 may compare a transmission ratio $W_B/W_{1B}$ and a maximum transmission ratio K when assignment of a transmission rate $W_B$ (or bandwidth) is requested from the receiving apparatus 120. According to the compared result, when the transmission ratio $W_B/W_{1B}$ is greater than the maximum transmission ratio K, the TDM 240 may output a failure message for the diversity gain request, and the transmission antenna 260 may transmit the outputted failure message to the receiving apparatus 120. As a result, the transmitting apparatus 110 may terminate a response procedure for the diversity request of the receiving apparatus 120.

Conversely, according to the compared result, when the transmission ratio $W_B/W_{1B}$ is greater than or equal to '1' and smaller than or equal to the maximum transmission ratio K, that is, $1 \leq W_B/W_{1B} \leq K$, the TDM 240 may determine $W_B/W_{1B}$ number of sub-streams satisfying $W_B/W_{1B} \leq K$, and perform time division multiplexing of the determined $W_B/W_{1B}$ number of sub-streams to thereby output the multiplexed sub-streams (parallel signals) as the second serial signals.

Also, when assignment of a transmission rate (or bandwidth) and the time diversity gain are requested from the receiving apparatus 120, the TDM 240 may compare, with a maximum time diversity gain, the sum of a transmission ratio of the requested transmission rate to another transmission rate for each of the parallel signals and the requested time diversity. Also, the TDM 240 may determine a number of the parallel signals to correspond to the maximum time diversity gain based on the compared result, and perform time division multiplexing of the determined number of parallel signals.

Specifically, when a bandwidth $W_B^m$ and a time diversity gain $G_t^m$ with respect to a sub-stream m (parallel signals) are requested from the receiving apparatus 120, the TDM 240 may compare, with the maximum time diversity gain K, the sum $$\sum_{m=0}^{M-1} G_t^m W_B^m / W_{1B}$$

of a transmission ratio $W_B^m/W_{1B}$ and the time diversity gain $G_t^m$. According to the compared result, when the sum of $$\sum_{m=0}^{M-1} G_t^m W_B^m / W_{1B}$$

of the transmission ratio $W_B^m/W_{1B}$ and the time diversity gain $G_t^m$ is greater than the maximum time diversity gain K, the TDM 240 may output a failure message for the diversity gain request, and the transmission antenna 260 may transmit the outputted failure message to the receiving apparatus 120. As a result, the transmission apparatus 110 may terminate a response procedure for the diversity request and the transmission rate (bandwidth) request of the receiving apparatus 120.

Conversely, the sum $$\sum_{m=0}^{M-1} G_t^m W_B^m / W_{1B}$$

of the transmission ratio $W_B^m/W_{1B}$ and the time diversity gain $G_t^m$ is smaller than or equal to the maximum time diversity gain, the TDM 240 determine the number of sub-streams (parallel signals) satisfying $$\sum_{m=0}^{M-1} G_t^m W_B^m / W_{1B} < K$$

to be M(1=1~K), and determine $$K - \sum_{m=0}^{M-1} G_t^m W_B^m / W_{1B}$$

number of the remaining sub-streams. As a result, the TDM 240 may determine the number of sub-streams (parallel signals) to be K, and perform time division multiplexing of the determined K number of sub-streams to thereby output the multiplexed sub-streams (parallel signals) as the second serial signals.

The upconverter 250 may receive an input of the outputted second serial signals, and convert the received signals into signals having a high frequency to thereby output.

The transmission antenna 260 may transmit the outputted second serial signals having the high frequency to the receiving apparatus 120.

Figure 3:
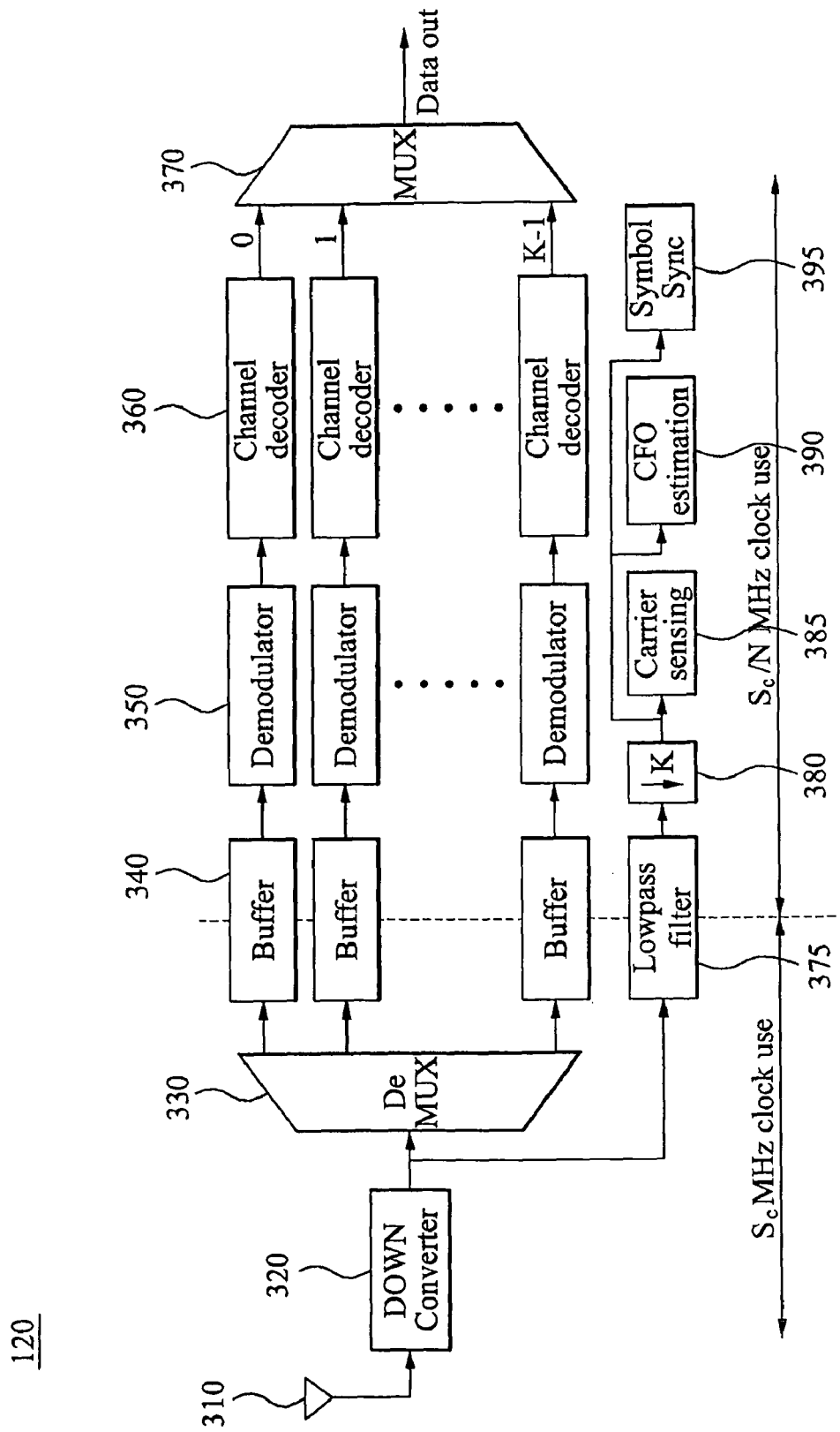
FIG. 3 is a block diagram illustrating a receiving apparatus of a time division multiplexing communication system with a parallel structure according to an exemplary embodiment of the present invention.

FIG. 3 is a block diagram illustrating a receiving apparatus of a time division multiplexing communication system with a parallel structure according to an exemplary embodiment of the present invention.

Referring to FIGS. 1 and 3, the receiving apparatus 120 may include a receiving antenna 310, a downconverter 320, a time division demultiplexer 330, a plurality of buffers 340, a plurality of demodulators 350, a plurality of channel decoder 360, and a Time Division Multiplexer (TDM) 370.

The receiving antenna 310 may receive second serial signals from the transmission apparatus 110. In this time, the second serial signals are converted into signals having a high frequency.

The downconverter 320 may receive an input of the second serial signals having a high frequency, and convert the received signals into signals having a low frequency to thereby output.

The time division demultiplexer 330 may receive an input of the second serial signals, which are converted into original signals having low frequency, and perform time division demultiplexing of the received second serial signals to thereby output the demultiplexed serial signals to a plurality of parallel signals. In this instance, the time division demultiplexer 330 may time division demultiplexing of the second serial signals in a demultiplexing ratio corresponding to the multiplexing ratio of the transmission apparatus 110.

The plurality of buffers 340 may temporarily store each of the outputted parallel signals.

The plurality of demodulators 350 may demodulate each of the stored parallel signals.

The plurality of channel decoders 360 may decode each of the demodulated parallel signals.

The time division multiplexer 370 may perform time division multiplexing of each of the decoded parallel signals to thereby restore the multiplexed parallel signals to as first serial signals, that is, original signals.

In addition, the receiving apparatus 120 may further include a low-pass filter 375 for removing high frequency noise from the second serial signals received from the transmission apparatus 110, a down sampler 380 for lowering the speed of a receiving locked loop, a carrier sensor 385 for sensing whether signals can be received, a carrier frequency offset detector 390, and a symbol synchronization detector 395, and the like.

Figure 4:
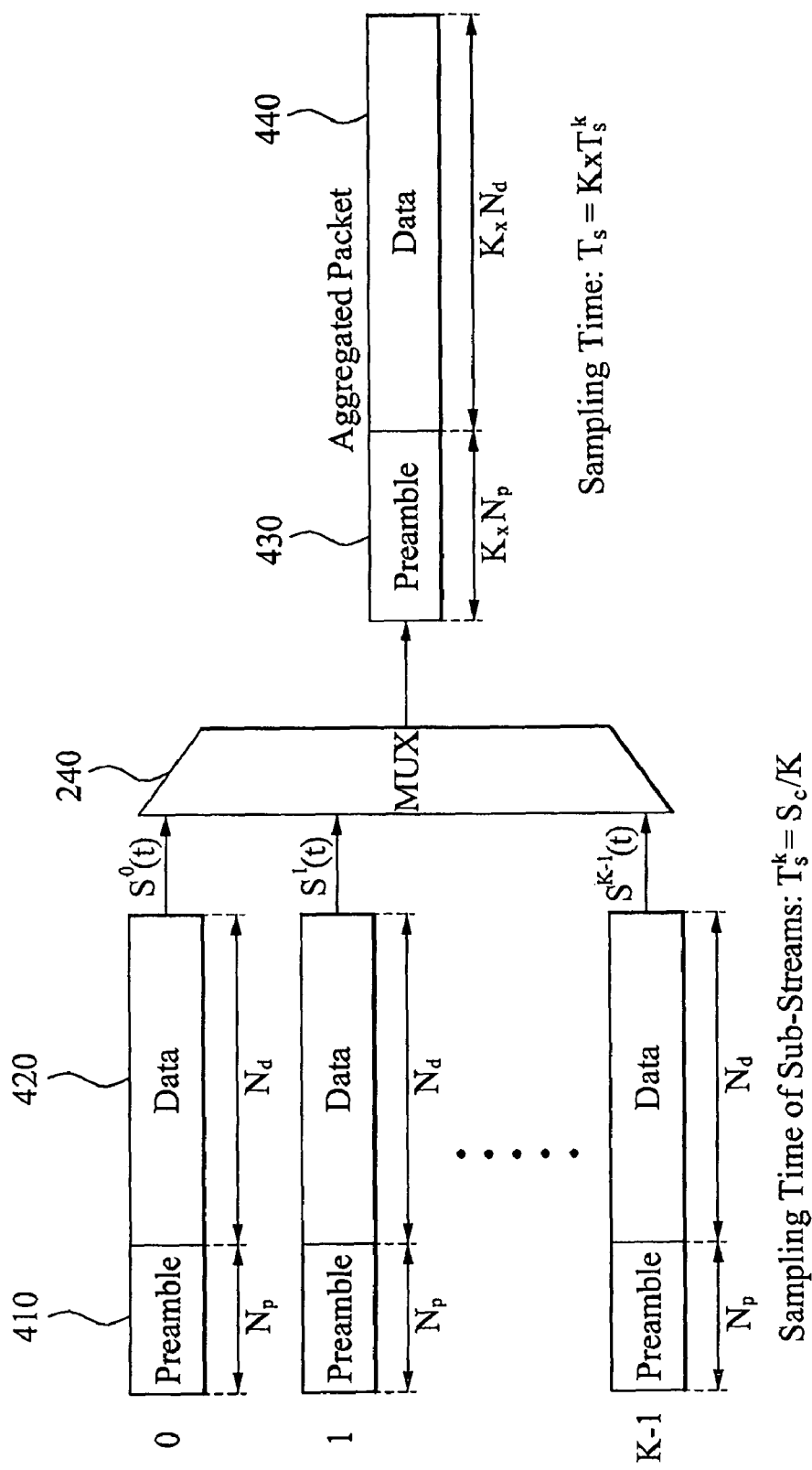
FIG. 4 is a block diagram illustrating a structure of a transmission packet used in a time division multiplexing communication system with a parallel structure according to an exemplary embodiment of the present invention.

FIG. 4 is a block diagram illustrating a structure of a transmission packet used in a time division multiplexing communication system with a parallel structure according to an exemplary embodiment of the present invention.

As shown in FIG. 4, the transmission packet according to the present exemplary embodiment of the invention may be comprised of a preamble 410 and data 420, however, may be comprised of the preamble, a midamble, a pilot, data, and the like.

K transmission packets of a lower unit including the preamble 410 and the data 420 may be changed to a single greater packet through the time division multiplexing. Specifically, the TDM 240 of FIG. 2 may perform time division multiplexing of the K transmission packets of the lower unit to thereby output the multiplexed K transmission packets as a single greater packet.

Here, when a length of the packet of the lower unit is denoted as $N_m$, and each of lengths of the preamble 410 and data 420 is denoted as $N_p$ and $N_d$, the length of packet of lower unit is represented by $$N_m = N_p + N_d. \qquad \text{[Equation 1]}$$

A k-th transmission signal of a lower unit from a time t may be represented by $S^k(t)$. When a sampling period of the transmission signal $S^k(t)$ is denoted as $T_S^k$, an output sampling period $T_S$ of the TDM (see reference numeral 240 of FIG. 2) may be represented by $$T_S = K \times T_S^k. \qquad \text{[Equation 2]}$$

A length of an integrated transmission packet obtained by performing time division multiplexing of the K transmission packets of the lower unit is represented by $K \times N_p + K \times N_d$. In this instance, the transmission signal S(t) of the integrated transmission packet may be represented by $$S(t) = \sum_{n=0}^{N_m-1} \sum_{k=0}^{K-1} S^k(t - nK - k)\delta(t - nK - k). \qquad \text{[Equation 3]}$$

In this instance, when it is assumed that a channel may be comprised of independent radio paths having L delays (delay; $\tau_l$, l=0, ..., L−1), each of radio path gains is denoted as $h_l$, and $$\sum_{l=0}^{L-1} E[|h_l|^2] = 1$$

is satisfied with respect to each of the gains, the channel h(t) may be represented by $$h(t) = \sum_{l=0}^{L-1} h_l \delta(t - \tau_l),$$ [Equation 4]

wherein δ(t) denotes an impulse response.

The receiving signal r(t) from the time $t=-N_p \times K \sim N_d \times K$ of FIG. 4 may be represented by $$r(t) = \sum_{l=0}^{L-1} h_l s(t - \tau_l) + w(t),$$ [Equation 5]

wherein w(t) denotes an additive white Gaussian noise. In this instance, when an average is '0' and a single-sided power spectrum density is $N_0$, and a variance is $2N_0/T_c$.

Hereinafter, transmitting/receiving methods of the time division multiplexing communication system with a parallel structure according to exemplary embodiments of the present invention will be described in detail with reference to drawings.

Figure 5:
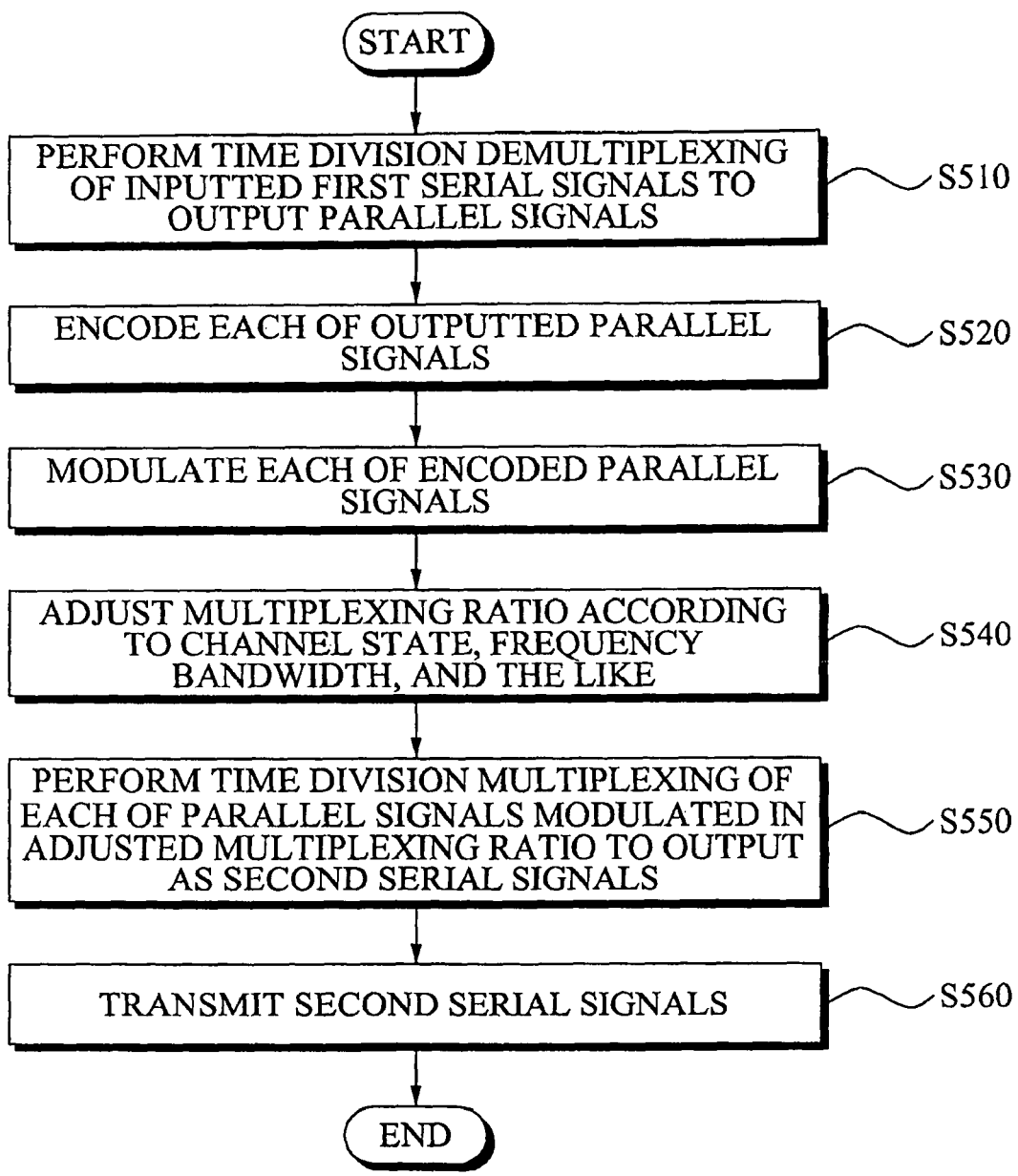
FIG. 5 is a flowchart illustrating a transmission method of a time division multiplexing communication system with a parallel structure according to an exemplary embodiment of the present invention.

FIG. 5 is a flowchart illustrating a transmission method of a Time Division Multiplexing (TDM) communication system with a parallel structure according to an exemplary embodiment of the present invention. The transmission method of TDM communication system may be implemented by the transmission apparatus of the TDM communication system.

In operation S510, the transmission apparatus may receive an input of first serial signals from an external device or an internal memory means, and perform time division demultiplexing of the inputted first serial signals to thereby output the demultiplexed serial signals as a plurality of parallel signals. Specifically, the transmission apparatus may change the first serial signals received in serial into signals in parallel, and divide a space to thereby output as the plurality of parallel signals.

In operation S520, the transmission apparatus may encode each of the outputted parallel signals. Specifically, the transmission apparatus may convert each of the outputted parallel signals into digital signals to thereby output.

In operation S530, the transmission apparatus may modulate each of the encoded parallel signals. In this instance, the transmission apparatus may modulate each of the encoded parallel signals in a predetermined modulation scheme. The modulation scheme may include a Frequency Shift Keying (FSK), Amplitude Shift Keying (ASK), Phase Shift Keying (PSK), Quadrature Amplitude Modulation (QAM), and the like.

In operation S540, the transmission apparatus may adjust a multiplexing ratio according to channel related-information of the transmission apparatus or the receiving apparatus, for example, transmitting/receiving channel states, frequency bandwidths, a user request-transmission rate, a Single-to-Noise Ratio (SNR), and the like. Specifically, the transmission apparatus may adjust a number of parallel flows according to the channel related-information.

In operation S540, the transmission apparatus may perform time division multiplexing of each of the modulated parallel signals in the adjusted multiplexing ratio to thereby output the modulated parallel signals. Specifically, the transmission apparatus performs time division multiplexing of the adjusted number of parallel flows (parallel signals) in the multiplexing ratio adjusted according to the channel related-information to thereby output the multiplexed parallel signals as the second serial signals.

Specifically, in operations 540 and 550, the transmission apparatus may adjust a time diversity gain according to the channel related-information, and adjust the multiplexing ratio based on the adjusted time diversity gain. Also, the transmission apparatus may perform time division multiplexing of each of the parallel signals in the adjusted multiplexing ratio to thereby output the multiplexed parallel signals as the second serial signals.

Thus, the transmission apparatus may increase an amount of data that can be processed simultaneously by increasing the multiplexing ratio when the receiving apparatus requests a high transmission rate, and reduce the amount of the data by reducing the multiplexing ratio when the receiving apparatus requests a low transmission rate. Specifically, the transmission apparatus may perform time division multiplexing of each of the modulated parallel signals in the multiplexing ratio depending on the channel related-information, thereby variably adjusting the transmission rate.

As described above, the transmission apparatus may adjust the data transmission amount according to the request transmission rate from the receiving apparatus, thereby adjusting power consumption. Also, the transmission apparatus may be embodied in a parallel structure, thereby increasing an operation speed of all hardware in the high-speed system.

Hereinafter, a process for adjusting the time diversity gain will be described in detail with reference to FIGS. 7 to 10. The process for adjusting the time diversity gain may be mainly classified into a case where the time diversity gain is requested from the receiving apparatus, and a case where assignment of a transmission rate or bandwidth is requested. Here, FIGS. 7 and 8 relate to the case where the time diversity gain is requested, FIG. 9 relates to the case where the assignment of the transmission rate or bandwidth is requested, and FIG. 10 relates to a case where the time diversity gain and the assignment thereof are simultaneously requested.

First, the case where the time diversity gain is requested will be described in detail. When the time diversity gain is requested from the receiving apparatus, the transmission apparatus may compare the requested time diversity gain with a maximum time diversity gain. Also, the TDM 240 may determine a number of the parallel signals to correspond to the maximum time diversity gain, and perform time division multiplexing of the determined number of parallel signals.

Figure 7:
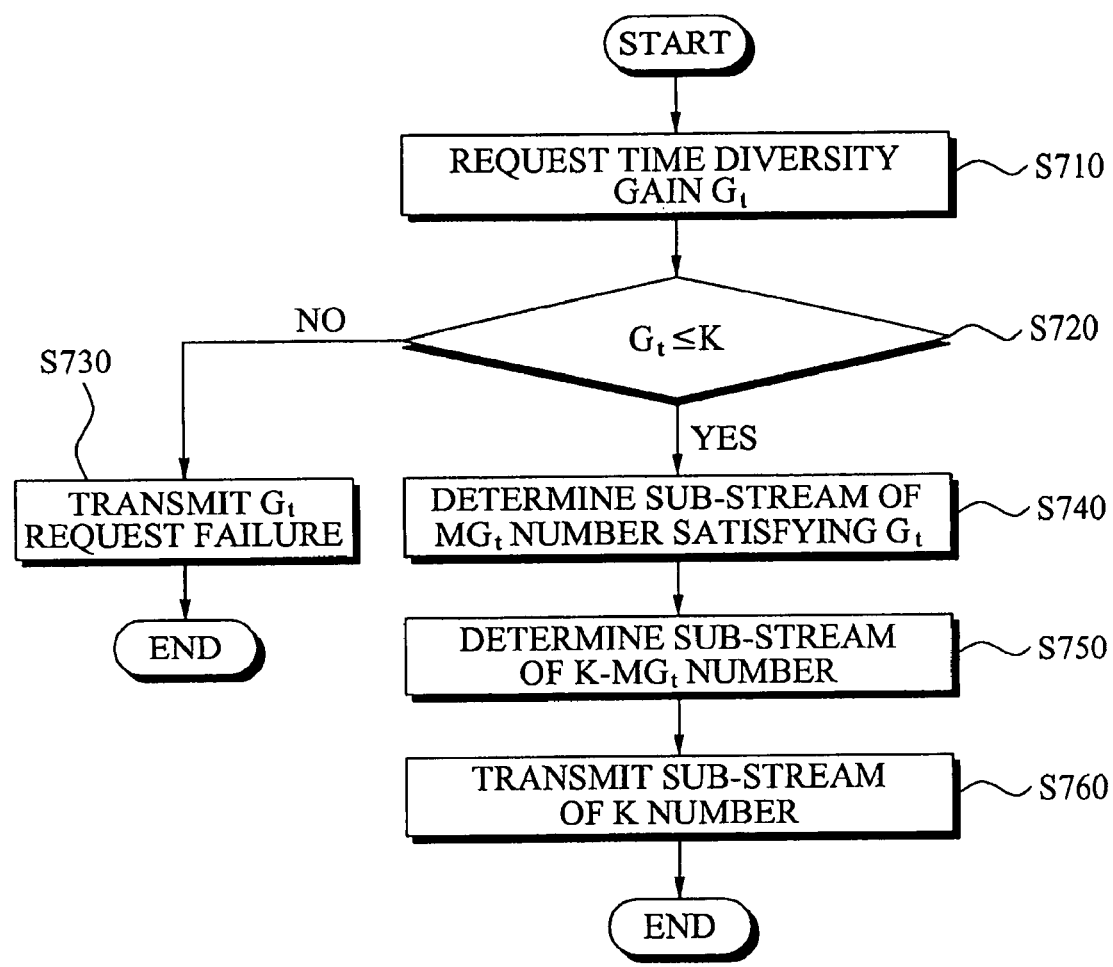
FIGS. 7 to 10 are flowcharts illustrating an example of a process for adjusting a time diversity gain according to exemplary embodiments of the invention.

Specifically, as shown in FIG. 7, in operation S710, the transmission apparatus may receive a request of a time diversity gain $G_t$ from the receiving apparatus. In this case, in operation S720, the transmission apparatus may compare the time diversity gain $G_t$ and the maximum time diversity gain K. According to the compared result, when the time diversity gain $G_t$ is greater than the maximum time diversity gain K (in a direction 'NO' of operation S720), the transmission apparatus may output a failure message for the diversity gain request, and transmit the outputted failure message to the receiving apparatus in operation S730. AS a result, the transmission apparatus may terminate a response procedure for the diversity request of the receiving apparatus.

Conversely, when the time diversity gain $G_t$ is smaller than or equal to the maximum time diversity gain K (in a direction of 'YES' of operation S720) based on the compared result, the transmission apparatus may determine $MG_t(\leq K)$ number of sub-streams so that the number of sub-streams (parallel signals) satisfying the time diversity gain $G_t$ is M(=1~K). In operation S750, the transmission apparatus may determine K−$MG_t$ number of the remaining sub-streams. Next, in operation S760, the transmission apparatus may transmit K number of sub-streams to the receiving apparatus. As a result, the transmission apparatus may determine the number of sub-streams to be K, and perform time division multiplexing of the determined K number of sub-streams to thereby output the multiplexed sub-streams as the second serial signals.

Figure 8:
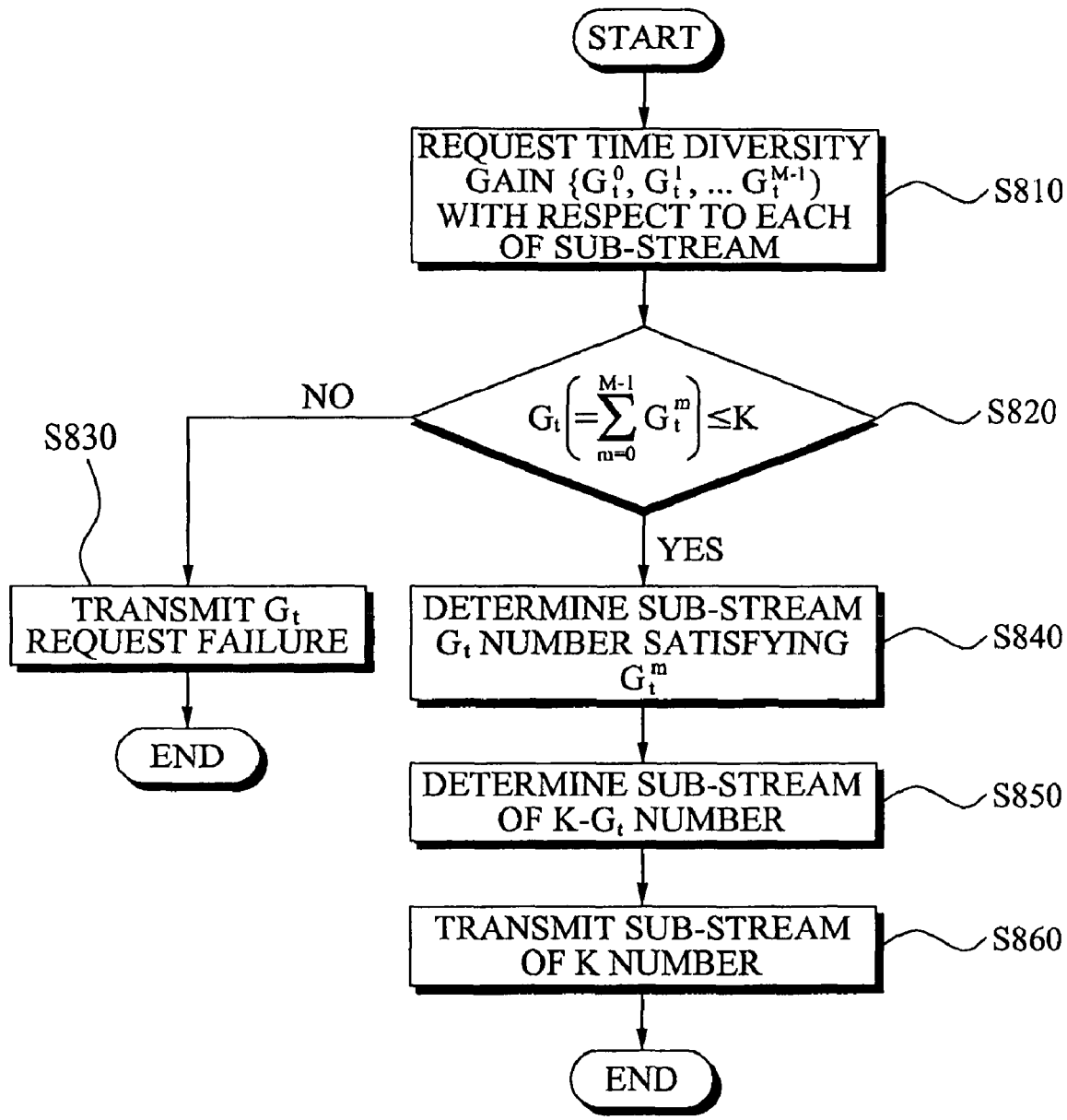

As shown in FIG. 8, in operation S810, the transmission apparatus may receive a request for time diversity gains $\{G_t^0, G_t^1, \ldots, G_t^{M-1}\}$ with respect to M number of sub-streams (parallel signals) from the receiving apparatus. In this case, in operation S820, the transmission apparatus may compare a sum $$G_t \left( = \sum_{m=0}^{M-1} G_t^m \right)$$

of the requested time diversity gain with the maximum time diversity gain K. When the sum $$G_t \left( = \sum_{m=0}^{M-1} G_t^m \right)$$

of the requested time diversity gain is greater than the maximum time diversity gain K according to the compared result (in a direction of 'NO' in operation S820), the transmission apparatus may output a failure message for the diversity gain request, and transmit the outputted failure message to the receiving apparatus. As a result, the transmission apparatus may terminate a response procedure for the diversity request of the receiving apparatus Conversely, when the sum $$G_t \left( = \sum_{m=0}^{M-1} G_t^m \right)$$

of the request time diversity gain is less than or equal to the maximum time diversity gain according to the compared result (in a direction of 'YES' in operation S820), the transmission apparatus may determine M(=1~K) number of sub-streams (parallel signals) satisfying the requested time diversity gain $G_t$ in operation S840. In operation S850, the transmission apparatus may determine the number of sub-streams to be K, and perform time division multiplexing of the determined K number of sub-streams to thereby output the multiplexed signals as the second serial signals.

Next, the case where assignment of the transmission rate or bandwidth is requested will be described in detail.

When the assignment of the transmission rate or bandwidth is requested, the transmission apparatus may compare a transmission ratio of the requested transmission to a transmission rate for each of the parallel signals with a maximum transmission ratio. Also, the transmission apparatus may determine the number of the parallel signals to correspond to the transmission ratio, and perform time division multiplexing of the determined number of the parallel signals.

Figure 9:
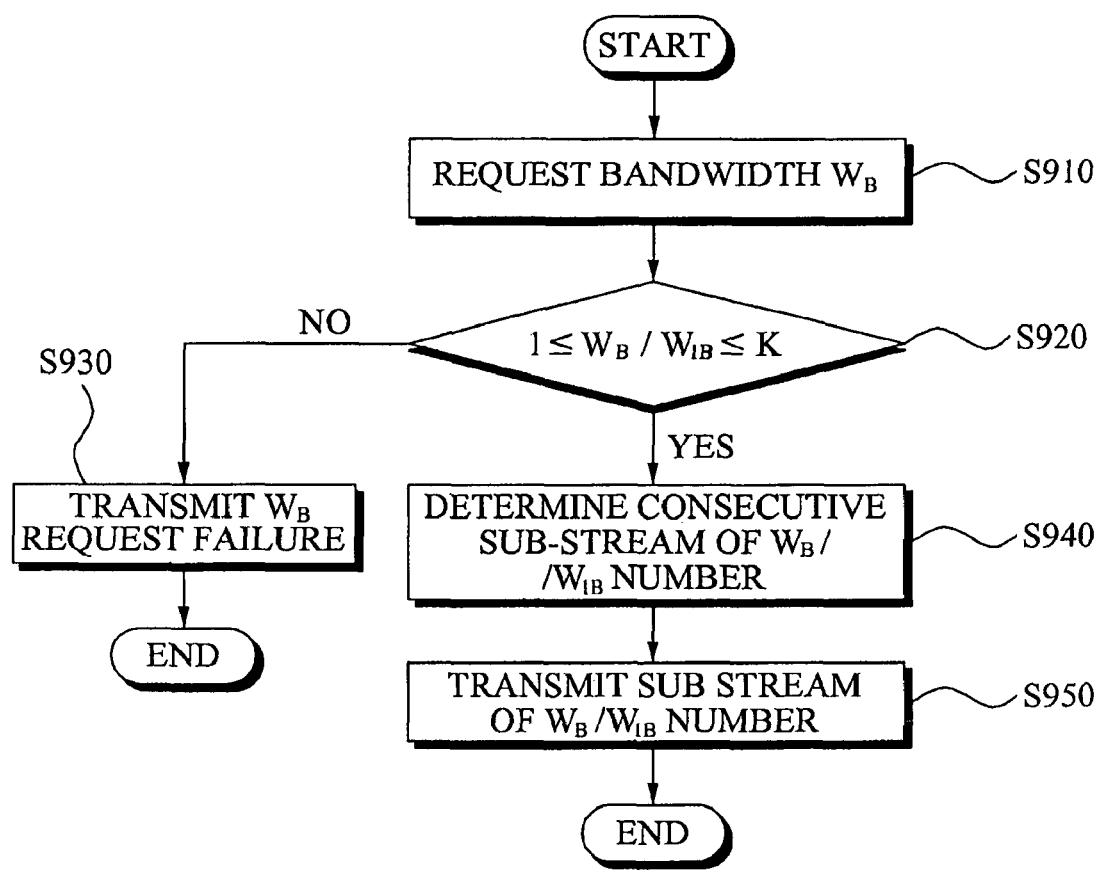

Specifically, as shown in FIG. 9, in operation S910, the transmission apparatus may receive a request for assignment of a transmission rate $W_B$ (or bandwidth) from the receiving apparatus. In this instance, the transmission rate (or bandwidth) for each of the sub-streams (parallel signals) may be $W_{1B}$. In this case, in operation S920, the transmission apparatus may compare a transmission ratio $W_B/W_{1B}$ and the maximum transmission ratio K. When the transmission ratio $W_B/W_{1B}$ is greater than the maximum transmission ratio K (in a direction of 'NO' in operation S920) according to the compared result, the transmission apparatus may output a failure message for the diversity gain request, and transmit the outputted failure message to the receiving apparatus in operation S930. As a result, the transmission apparatus may terminate a response procedure for the diversity request of the receiving apparatus.

Conversely, when the transmission ratio $W_B/W_{1B}$ is greater than or equal to '1' and smaller than the maximum transmission ratio K ($1 \leq W_B/W_{1B} \leq K$) in a direction of 'YES' in operation S920, the transmission apparatus may determine a number of sub-streams $W_B/W_{1B}$ satisfying $W_B/W_{1B} \leq K$ in operation S940. Also, in operation S950, the transmission apparatus may transmit the determined number $W_B/W_{1B}$ of sub-streams to the receiving apparatus. As a result, the transmission apparatus may perform time division multiplexing of the determined number $W_B/W_{1B}$ of sub-streams to thereby output the multiplexed sub-streams as the second serial signals.

Hereinafter, the case where assignment of the transmission rate or bandwidth, and the time diversity gain are simultaneously requested will be described in detail. When the assignment of the transmission rate or bandwidth, and the time diversity gain are simultaneously requested from the receiving apparatus, the transmission apparatus may compare, with a maximum time diversity gain, the sum of a transmission ratio of the requested transmission rate to another transmission rate for each of the parallel signals and the requested time diversity. Also, the transmission apparatus may determine a number of parallel signals to correspond to the maximum time diversity gain based on the compared result, and perform time division multiplexing of the determined number of parallel signals.

Figure 10:
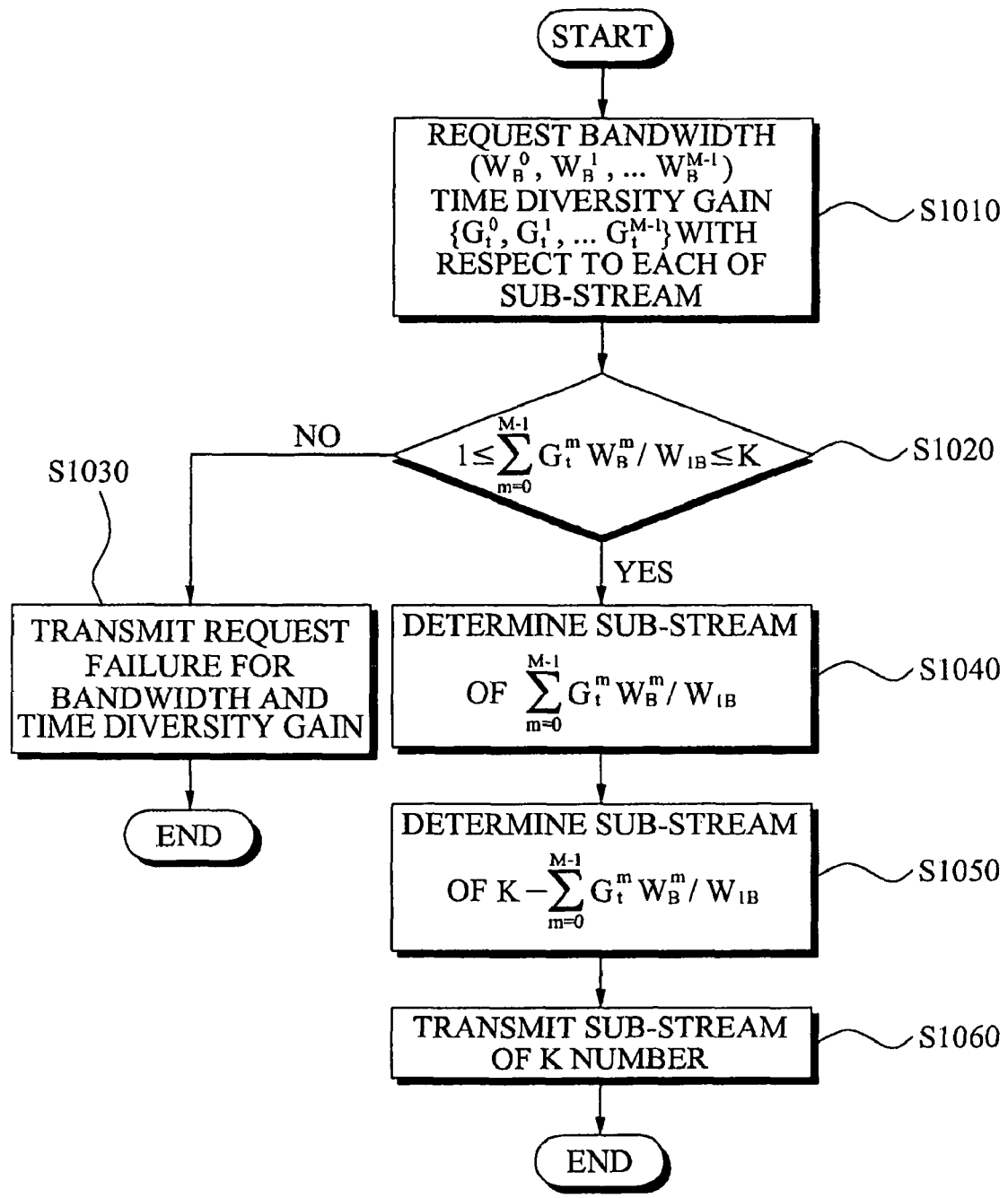

Specifically, as shown in FIG. 10, in operation S1010, the transmission apparatus may receive requests for a bandwidth $W_B^m$ with respect to a sub-stream (parallel signal) m and a time diversity gain $G_t^m$ from the receiving apparatus. In this case, in operation S1020, the transmission apparatus may compare, with a maximum time diversity gain K, a sum $$\sum_{m=0}^{M-1} G_t^m W_B^m / W_{1B}$$

of the transmission ratio $W_B^m/W_{1B}$ and the time diversity gain $G_t^m$. When the sum is $$\sum_{m=0}^{M-1} G_t^m W_B^m / W_{1B}$$

greater than the maximum time diversity gain K based on the compared result (in a direction of 'NO' in operation S1020), the transmission apparatus may output a failure message for the diversity gain request, and transmit the outputted failure message to the receiving apparatus. As a result, the transmission apparatus may terminate a response procedure for the diversity and transmission (bandwidth) request of the receiving apparatus.

Conversely, when the sum $$\sum_{m=0}^{M-1} G_t^m W_B^m / W_{1B}$$

is smaller than or equal to the maximum time diversity gain K based on the compared result (in a direction of YES' in operation S1020), the transmission apparatus may determine M(=1~K) number of sub-streams $$\sum_{m=0}^{M-1} G_t^m W_B^m / W_{1B} < K$$

satisfying in operation S1040. Also, in operation S1050, the transmission apparatus may determine $$K - \sum_{m=0}^{M-1} G_t^m W_B^m / W_{1B}$$

number of the remaining sub-streams. Next, in operation S1060, the transmission apparatus may transmit K number of sub-streams to the receiving apparatus. As a result, the transmission apparatus may determine the number of sub-streams (parallel signals) to be K, and perform time division multiplexing of the determined number of sub-streams to thereby output the multiplexed parallel signals as the second serial signals.

As described above, the transmission apparatus may receive at least one request of the time diversity gain and the bandwidth (or transmission rate) from the receiving apparatus, and adjust the time diversity gain according to the requests. As a result, the transmission apparatus may adjust a multiplexing ratio based on the adjusted time diversity gain, and thus variably adjust the transmission rate.

Referring to again FIG. 5, in operation S560, the transmission apparatus may receive the outputted second serial signals to the receiving apparatus. In this instance, the transmission apparatus may convert the outputted second serial signals into signals having a high frequency, and transmit the high frequency-second serial signals to the receiving apparatus.

Figure 6:
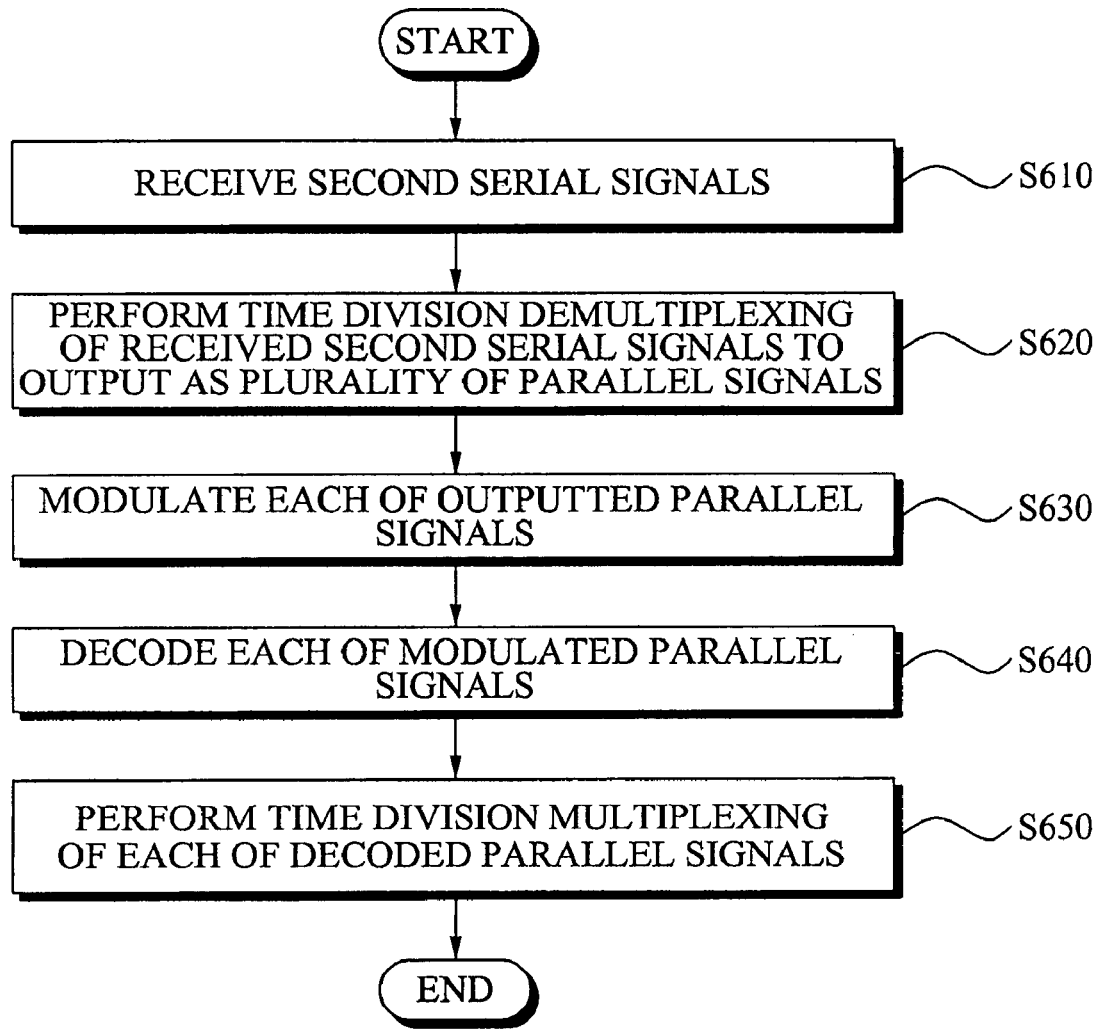
FIG. 6 is a flowchart illustrating a receiving method of a time division multiplexing communication system with a parallel structure according to an exemplary embodiment of the present invention.

FIG. 6 is a flowchart illustrating a receiving method of a Time Division Multiplexing (TDM) communication system with a parallel structure according to an exemplary embodiment of the present invention. The receiving method of TDM communication system according to the exemplary embodiment of the invention may be implemented by the receiving apparatus of the TDM communication system.

In operation S610, the receiving apparatus may receive second serial signals from the transmission apparatus. Specifically, the receiving apparatus may receive the second serial signals which are converted into signals having a high frequency. Next, the receiving apparatus may receive an input of the low frequency-second serial signals, and convert the inputted serial signals into low frequency-serial signals to thereby output.

In operation S620, the receiving apparatus may receive the low frequency-second serial signals, and perform time division demultiplexing of the inputted second serial signals to thereby output the demultiplexed serial signals as a plurality of parallel signals. In this instance, the receiving apparatus may perform time division demultiplexing of the second serial signals in a demultiplexing ratio corresponding to the multiplexing ratio of the transmission apparatus to thereby output the demultiplexed serial signals as the plurality of parallel signals. In this instance, the receiving apparatus may temporarily store each of the outputted parallel signals in the plurality of buffers.

In operation S630, the receiving apparatus may demodulate each of the outputted parallel signals.

In operation S640, the receiving apparatus may decode each of the demodulated parallel signals.

In operation S650, the receiving apparatus may perform time division multiplexing of each of the decoded parallel signals to thereby restore the multiplexed parallel signals as the first serial signals, that is, original signals.

Figure 11:
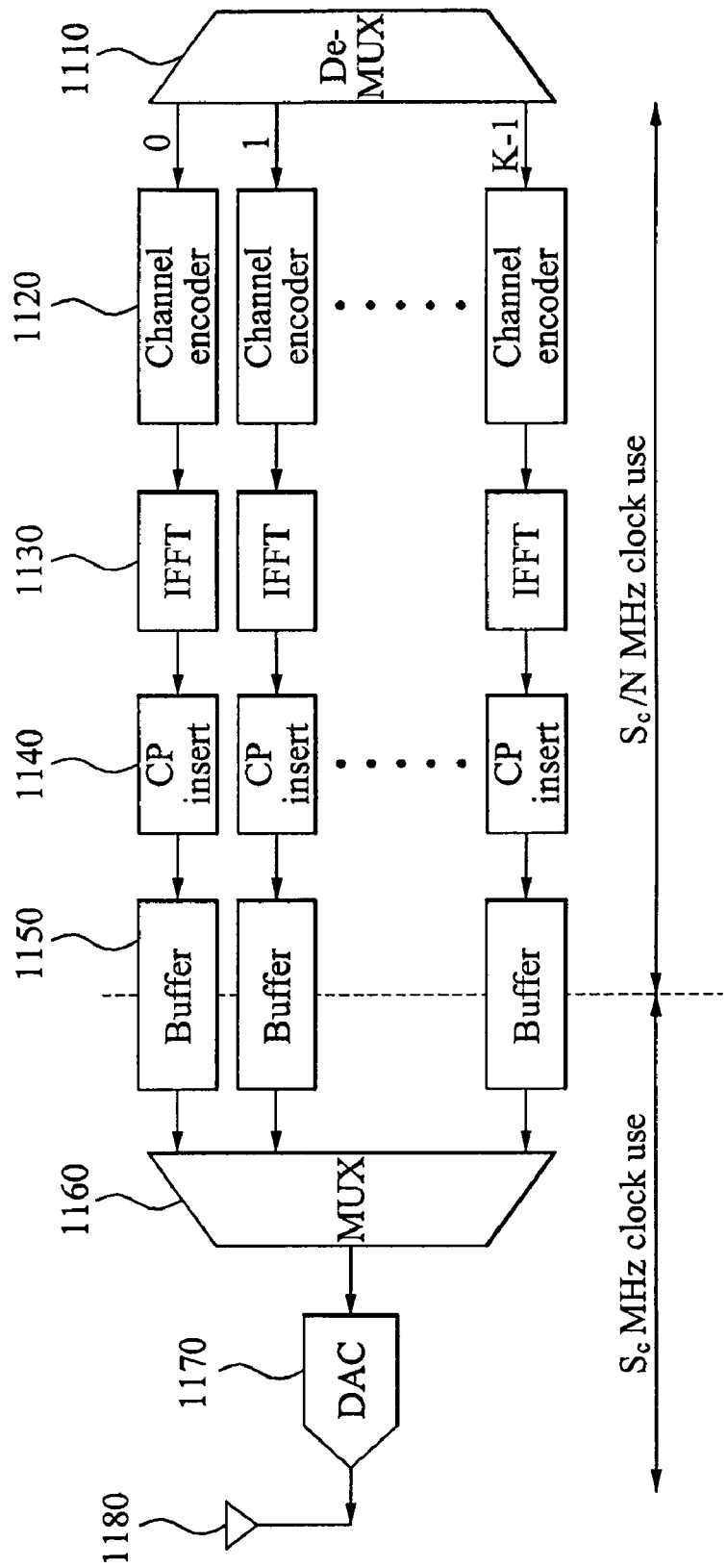
FIG. 11 illustrates an example of a transmission apparatus of an Orthogonal Frequency Division Multiplexing (OFDM) system adopting a time division multiplexing communication system with a parallel structure according to an exemplary embodiment of the present invention.

FIG. 11 illustrates an example of a transmission apparatus of an Orthogonal Frequency Division Multiplexing (OFDM) system adopting a time division multiplexing communication system with a parallel structure according to an exemplary embodiment of the present invention.

Referring to FIG. 11, the transmission apparatus of the OFDM system may include a time division demultiplexer 1110, a plurality of channel encoders 1120, a plurality of inverse Fourier transformers 1130, a plurality of cyclic prefix inserting units 1140, a plurality of buffers 1150, a time division multiplexer 1160, a digital-analog converter 1170, and a transmission antenna 1180.

The time division demultiplexer 1110 may receive an input of first serial signals from an external device or internal memory means, and perform time division demultiplexing of the inputted first serial signals to thereby output the demultiplexed serial signals as a plurality of parallel signals. Specifically, the time division demultiplexer 1110 may change the first serial signals received in serial to signals in parallel, and divide a space to thereby output as the plurality of parallel signals.

The plurality of encoders 1120 may encode each of the outputted parallel signals.

The plurality of inverse Fourier transformers 1130 may perform inverse Fourier transforming of each of the encoded parallel signals.

The plurality of cyclic prefix inserting units 1140 may insert cyclic prefix to each of the inverse Fourier transformed parallel signals.

The plurality of buffers 1150 may temporarily store each of the parallel signals where the cyclic prefix is inserted.

The time division multiplexer 1150 may adjust a multiplexing ratio according to channel related-information such as channel states (transmitting/receiving), frequency bands, transmission rates, Signal-to-Noise Ratio (SNR), and the like. Specifically, the time division multiplexer 1150 may adjust a number of parallel flows according to the channel related-information.

Also, the time division multiplexer 1150 may perform time division multiplexing of each of the parallel signals in the adjusted multiplexing ratio to thereby output the multiplexed parallel signals as second serial signals. Specifically, the time division multiplexer 1150 may perform time division multiplexing of the adjusted number of parallel flows (parallel signals) in the adjusted multiplexing ratio depending on the channel related-information to thereby output the multiplexed parallel signals as the second serial signals.

The digital-analog converter 1170 may convert the outputted second serial signals into analog signals to thereby output.

The transmission antenna 1180 may transmit the second serial signals outputted into the analog signals.

Figure 12:
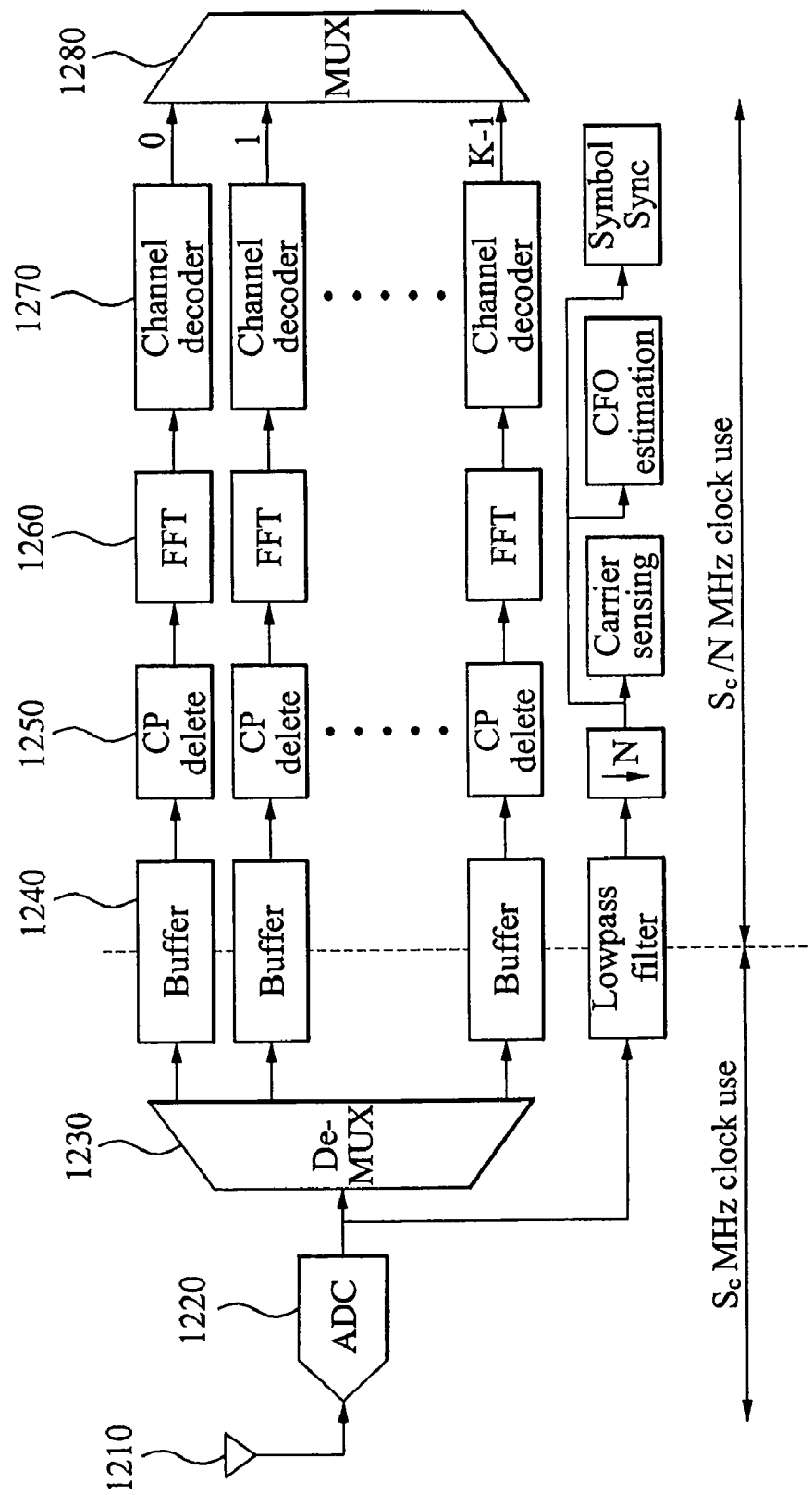
FIG. 12 illustrates an example of a receiving apparatus of an OFDM system adopting a time division multiplexing communication system with a parallel structure according to an exemplary embodiment of the present invention.

FIG. 12 illustrates an example of a receiving apparatus of an OFDM system adopting a time division multiplexing communication system with a parallel structure according to an exemplary embodiment of the present invention.

Referring to FIG. 12, the receiving apparatus of the OFDM system may include a receiving antenna 1210, an analog-digital converter 1220, a time division demultiplexer 1230, a plurality of buffers 1240, a plurality of cyclic prefix removers 1250, a plurality of Fourier transformers 1260, a plurality of channel decoders 1270, and a time division multiplexer 1280.

The receiving antenna 1210 may receive second serial signals from a transmission apparatus.

The analog-digital converter 1220 may convert the received second serial signals into digital signals.

The time division demultiplexer 1230 may perform time division demultiplexing of the second serial signals converted into the digital signals to thereby output the demultiplexed serial signals as a plurality of parallel signals. In this instance, the time division demultiplexer 1230 may perform time division demultiplexing of the second serial signals in a demultiplexing ratio corresponding to the multiplexing ratio of the transmission apparatus to thereby output the demultiplexed serial signals as the plurality of parallel signals.

The plurality of buffers 1240 may temporarily store each of the outputted parallels signals.

The plurality of cyclic prefix removers 1250 may receive an input of each of the parallel signals from the plurality of buffers 1240, and remove the cyclic prefix inserted in the inputted parallel signals.

The plurality of Fourier transformers 1260 may perform Fourier transforming of each of the parallel signals where the cyclic prefix is removed to thereby output.

The plurality of channel decoders 1270 may decode each of the outputted parallel signals.

The time division multiplexer 1280 may perform time division multiplexing of each of the decoded parallel signals to thereby restore the multiplexed parallel signals to first serial signals, that is, original signals.

The transmitting/receiving method of the time division multiplexing communication system according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Also, a Time Division (TD)-OFDM adopting the time division multiplexing communication system with the parallel structure according to the exemplary embodiments of the invention may perform communication using a frame structure below.

1. Frame Structure

Figure 13:
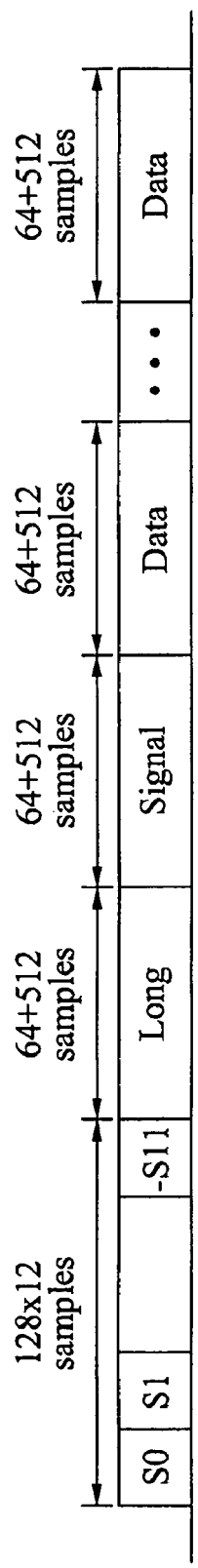

The frame structure may be devised as shown in FIG. 13. The frame structure may transmit a short symbol (short preamble) line where an OFDM symbol of a length of 128 samples is repeated twelve times to thereby start the frame. The last twelfth symbol is obtained by rotating a phase of the previous eleventh symbol by 180 degrees. A long symbol (long preamble) composed of 576 samples subsequent to the short symbol line may be used for inferring channels. Also, signal symbol (signal field) succeeding after the long symbol may be devised for transmitting information needed for demodulating receiving packets such a modulation schemes, channel code rate, a number of bytes included in the frame (data length), a scrambler seed, and Cyclic Redundancy Check (CRC) parity. Each data symbol is composed of 576 samples, and a number of data symbols may vary according to the number of bytes desired to be transmitted.

1.1 Structure of Short Symbol

Four times repetition of the short symbol may be created by inserting 512 complex numbers into 512-point Inverse Fast Fourier Transform (IFFT) as devised in Table 1 below. In Table 1, values obtained by inputting from −256 to 255 of subcarrier indexes of 512 point IFFT are shown, and the remaining values are '0'.

An index of DC carrier is '0'.

TABLE 1

| Frequency domain short symbol values | |
|---|---|
| Subcarrier index | Values |
| −196 | 1 |
| −164 | −1 |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1 |

The subcarrier values may be obtained from a permutation of a maximum 31 length. The subcarrier used for the short symbol may be selected by four times (factor) down-sampling without using a low-pass filter to thereby obtain a power such as input signals. The present invention may be accomplished by only using the subcarrier maintained to prevent spectrums from being superposed one on another after down-sampling. In addition, the down-sampling may be devised not to destroy repetition characteristics of a time domain permutation. Since a single subcarrier occupies in an identical position from each four subcarriers, the repetition characteristics may be maintained despite the superposed spectrum due to the dawn-sampling. Two characteristics such as repeating and maintaining the identical power even after the down-sampling may enable a receiver to use the short symbol received without the low-pass filter. In order to more improve the performance, the two characteristics may be applicable in each of four frequency domains before operating a preamble.

IFFT operations for generating the short symbol may be obtained by $$r_{SHORT}(t) = \sum_{k=-256}^{255} S_k \cdot e^{j2\pi k \cdot \Delta f \cdot i}, \quad \text{[Equation 6]}$$

wherein $S_k$ denotes a frequency domain value illustrated in Table 1, and $\Delta f$ denotes an interval between a subcarrier and a carrier corresponding to 3.9 MHz as illustrated in Table 3. Twelve times repetition of the short symbol may be acquired by repeating the result of Equation 1 three times. A negative number of the last symbol may denote polarity reversion.

1.2 Long Symbol Structure

The long symbol may be devised to be created by IFFT operation with respect to a frequency domain permutation of Equation 7, which is represented by {$L_{-256}, L_{-255}, \ldots, L_{255}$} = [Equation 7]

{0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, −1, 1,

−1, −1, 1, 1, 1, 1, −1, 1, −1, 1, −1, −1, 1, −1, 1,

−1, −1, −1, −1, −1, −1, 1, −1, 1, −1, 1, −1, 1, −1, 1, 1, 1, 1, 1, −1, 1, −1, 1, 1, −1, 1, −1, −1, −1, −1,

−1, 1, 1, −1, 1, 1, 1, −1, 1, 1, −1, 1, 1, −1, 1, −1, 1, 1, −1, −1, −1, −1, −1, 1, −1, 1, 1, 1, −1, 1, 1, 1, 1, 1, −1, −1, −1, 1, 1, 1, 1, −1, −1, 1, 1, −1, 1,

−1, −1, 1, 1, −1, 1, −1, 1, 1, 1, −1, −1, −1, 1, 1,

−1, 1, −1, −1, −1, 1, −1, 1, 1, 1, 1, 1, 1, 1, −1, 1,

−1, −1, 1, −1, 1, 1 −1, −1, −1, 1, −1, 1, −1, −1, 1, 1, −1, −1, −1, 1, 1, −1, −1, −1, −1, −1, −1,

−1, 1, 1, −1, −1, 1, 1, −1, −1, 1, 1, −1, 1, −1, 1, 1,

−1, −1, 1, −1, −1, 1, 1, 1, 1, 1, 1, −1, 1, 1, −1, 1, 1,

−1, −1, 1, −1, −1, 1, −1, −1, 1, 1, −1, 1, 1, 0, 0, 0, 1, 1, 1, −1, −1, −1, 1, −1, −1, 1, −1, 1, −1, 1,

−1, −1, −1, 1, 1, −1, 1, 1, −1, −1, 1, 1, 1, 1, 1, −1,

−1, 1, 1, 1, 1, −1, −1, −1, 1, −1, 1, 1, −1, 1, 1, 1,

−1, −1, 1, −1, 1, −1, 1, −1, −1, −1, −1, −1,

1, −1, −1, 1, 1, 1, 1, −1, −1, −1, −1, 1, 1, 1, 1,

−1, 1, 1, 1, −1, −1, −1, −1, 1, −1, 1, 1, −1, −1, 1,

1, −1, 1, 1, −1, 1, 1, 1, −1, 1, −1, −1, −1, −1, 1, 1, 1, −1, −1, 1, 1, −1, −1, −1, −1, 1, −1, −1,

1, −1, −1, −1, 1, −1, 1, −1, 1, 1, 1, 1, −1, 1, −1, 1, 1, 1, 1, −1, −1, 1, −1, −1, 1, 1, 1, 1, 1, −1, −1, 1, 1, 1, −1, −1, −1, −1, −1, −1, 1, 1, 1, −1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0}.

This permutation may be acquired from a maximum length permutation having 511 length. The IFFT operation may perform Equation 8, which is represented by $$r_{LONG}(t) = \sum_{k=-256}^{255} L_k \cdot e^{j2\pi k \cdot \Delta f \cdot (t - T_{CP})}, \quad \text{[Equation 8]}$$

wherein $L_k$ denotes a frequency domain value illustrated in Equation 2, $\Delta f$ denotes an interval between the subcarrier and the carrier corresponding to 3.9 MHz illustrated in Table 3, and $T_{CP}$ denotes a cyclic prefix (CP) corresponding to 32 nsec illustrated in Table 3.

1.3 Signal Symbol Structure

Figure 14:
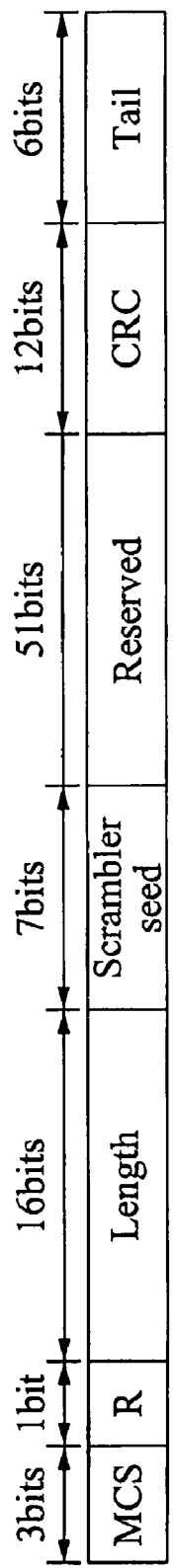

The signal symbol structure, as shown in FIG. 14, may be devised for transmitting information needed for modulating receiving packets such as Modulation and Code rate Symbol (MCS, 3 bits), a number of bytes included in the frame (length: 16 bits), scrambler seed (7 bits), CRC parity (12 bits), tail for initialization of a convolutional decoder (6 bits), and the like.

TABLE 2 various modulation schemes and channel code rates

| MCS | Channel code rate | Modulation scheme | Transmission rate (Gbps) |
|---|---|---|---|
| 0 | 1/2 | QPSK | 1 33 |
| 1 | 2/3 | QPSK | 1 78 |
| 2 | 1/2 | 16QAM | 2 67 |
| 3 | 2/3 | 16QAM | 3 56 |
| 4 | 3/4 | 16QAM | 4 00 |

A list of the modulation scheme and channel code rate of the subcarrier is devised in Table 2.

As preliminary bits, 1-bit after the MCS field and 51-bits after the scrambler seed are required to be '0'. A length field is a length of data being transmitted in a byte unit in a data symbol domain of the frame. CRC signals may be used for detecting reception errors in the signal symbol.

A CRC creation polynomial is $X^{12}+X^{11}+X^3+X^2+X+1$. '0' of six-tail bits is received in a CRC error detector from the end of CRC decoding of the signal symbol, thereby terminating the decoding operation.

Data in the signal field may be converted into a scrambler determined as the initial value of a first hexadecimal 3F, and encoded using an error correction encoder of ½. 192-bits of data encoded using the error correction encoder is repeated for four times before interleaving. 386 subcarriers are modulated in a Quadrature Phase Shift Keying (QPSK) scheme using 768-bits of data obtaining by repeating the four times repetition. The IFFT operation may be used for modulation of the subcarrier as shown in Equation 2.

1.4 OFDM Parameter

According to the present invention, the OFDM modulation technology may be used for transmitting data through radio signals of 60 GHz frequency bandwidth. Parameter of the modulation technology is summarized in Table 3.

TABLE 3

OFDM parameter

| Parameters | Values |
| --- | --- |
| Bandwidth | 1.76 GHz |
| Sampling rate | 2.16 GHz |
| Number of subcarriers | 512 |
| FFT period | 265 nsec |
| Subcarrier spacing | 4.2 MHz |
| Guard interval | 64 samples, 32 nsec |
| Symbol duration | 288 nsec |
| Number of data subcarriers | 384 |
| Number of DC subcarriers | 3 |
| Number of pilot subcarriers | 8 |
| Modulation | QPSK, 16QAM |
| Convolutional code | 1/2, 2/3, 3/4 |

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmission apparatus of a Time Division Multiplexing communication system with a parallel structure, the transmission apparatus comprising:

a Time Division Demultiplexer (TDDM) to perform time division demultiplexing of inputted first serial signals to thereby output the demultiplexed serial signals as a plurality of parallel signals;

a plurality of modulators to respectively modulate the outputted parallel signals;

a Time Division Multiplexer (TDM) to adjust a multiplexing ratio according to at least two or more different channel-related information, and to perform time division multiplexing of each of the modulated parallel signals in the adjusted multiplexing ratio to thereby output the multiplexed parallel signals as second serial signals, and wherein the respective second serial signals from the at least two or more different channel-related information are different; and a transmission antenna to transmit the outputted second serial signals, wherein the TDM compares a time diversity gain with a maximum time diversity gain when the time diversity gain is requested from a receiving apparatus, determines a number of the parallel signals to correspond to the maximum time diversity gain based on the compared result, and performs time division multiplexing of the determined number of parallel signals.

2. A transmission apparatus of a Time Division Multiplexing communication system with a parallel structure, the transmission apparatus comprising:

a Time Division Demultiplexer (TDDM) to perform time division demultiplexing of inputted first serial signals to thereby output the demultiplexed serial signals as a plurality of parallel signals;

a plurality of modulators to respectively modulate the outputted parallel signals;

a Time Division Multiplexer (TDM) to adjust a multiplexing ratio according to at least two or more different channel-related information, and to perform time division multiplexing of each of the modulated parallel signals in the adjusted multiplexing ratio to thereby output the multiplexed parallel signals as second serial signals, and wherein the respective second serial signals from the at least two or more different channel-related information are different; and a transmission antenna to transmit the outputted second serial signals, wherein when assignment of the transmission rate or bandwidth is requested from a receiving apparatus, the TDM compares, with a maximum transmission ratio, a transmission ratio of the requested transmission rate to another transmission rate for each of the parallel signals, determines a number of the parallel signals to correspond to the transmission ratio based on the compared result, and performs time division multiplexing of the determined number of parallel signals.

3. A transmission apparatus of a Time Division Multiplexing communication system with a parallel structure, the transmission apparatus comprising:

a Time Division Demultiplexer (TDDM) to perform time division demultiplexing of inputted first serial signals to thereby output the demultiplexed serial signals as a plurality of parallel signals;

a plurality of modulators to respectively modulate the outputted parallel signals;

a Time Division Multiplexer (TDM) to adjust a multiplexing ratio according to at least two or more different channel-related information, and to perform time division multiplexing of each of the modulated parallel signals in the adjusted multiplexing ratio to thereby output the multiplexed parallel signals as second serial signals, and wherein the respective second serial signals from the at least two or more different channel-related information are different; and a transmission antenna to transmit the outputted second serial signals, wherein when assignment of the transmission rate or bandwidth and time diversity gains are requested from a receiving apparatus, the TDM compares, with a maximum time diversity gain, the sum of a transmission ratio of the requested transmission rate to another transmission rate for each of the parallel signals and the requested time diversity, determines a number of the parallel signals to correspond to the maximum time diversity gain based on the compared result, and performs time division multiplexing of the determined number of parallel signals.

4. The transmission apparatus as in any one of claims 1, 2, and 3, wherein the TDM adjusts a time diversity gain according to the channel-related information, and adjusts the multiplexing ratio according to the adjusted time diversity gain.

5. A receiving apparatus of a Time Division Multiplexing communication system with a parallel structure, the receiving apparatus comprising:

a receiving antenna to receive second serial signals from a transmission apparatus, and wherein the received second serial signals are configured to have at least two or more different multiplexing ratios from the transmission apparatus;

a Time Division Demultiplexer (TDDM) to perform time division demultiplexing of the received second serial signals in a demultiplexing ratio corresponding to each of the two or more different multiplexing ratios of the transmission apparatus to thereby output the demultiplexed serial signals as a plurality of parallel signals;

a plurality of demodulators to respectively demodulate the outputted parallel signals; and a Time Division Multiplexer (TDM) to perform time division multiplexing of each of the demodulated parallel signals to thereby restore the multiplexed parallel signals as a first serial signal, wherein the TDM compares a time diversity gain with a maximum time diversity gain when the time diversity gain is requested, determines a number of the parallel signals to correspond to the maximum time diversity gain based on the compared result, and performs time division multiplexing of the determined number of parallel signals.

6. A transmission method of a time division multiplexing communication system with a parallel structure, the transmission method comprising:

performing time division demultiplexing of inputted first serial signals to thereby output the demultiplexed serial signals as a plurality of parallel signals; modulating each of the outputted parallel signals, wherein the performing of the time division multiplexing comprises:

comparing a time diversity gain with a maximum time diversity gain when the time diversity gain is requested from a receiving apparatus;

determining a number of the parallel signals to correspond to the maximum time diversity gain based on the compared result;

performing time division multiplexing of the determined number of parallel signals;

adjusting a multiplexing ratio according to a channel state and a frequency bandwidth, and performing time division multiplexing of each of the plurality of the demodulated parallel signals to thereby output the multiplexed parallel signals as second serial signals; and transmitting the outputted second serial signals.

7. A transmission method of a time division multiplexing communication system with a parallel structure, the transmission method comprising:

performing time division demultiplexing of inputted first serial signals to thereby output the demultiplexed serial signals as a plurality of parallel signals; modulating each of the outputted parallel signals, wherein the performing of the time division multiplexing comprises:

comparing, with a maximum transmission ratio, a transmission ratio of a transmission rate to another transmission rate for each of the parallel signals when assignment of the transmission rate or bandwidth is requested from a receiving apparatus;

determining a number of the parallel signals to correspond to the transmission rate based on the compared result;

performing time division multiplexing of the determined number of parallel signals;

adjusting a multiplexing ratio according to a channel state and a frequency bandwidth, and performing time division multiplexing of each of the plurality of the demodulated parallel signals to thereby output the multiplexed parallel signals as second serial signals; and transmitting the outputted second serial signals.

8. A transmission method of a time division multiplexing communication system with a parallel structure, the transmission method comprising:

performing time division demultiplexing of inputted first serial signals to thereby output the demultiplexed serial signals as a plurality of parallel signals; modulating each of the outputted parallel signals, wherein the performing of the time division multiplexing comprises:

comparing, with a maximum time diversity gain, the sum of a transmission ratio of a transmission rate to another transmission rate for each of the parallel signals and time diversity gain when assignment of the transmission rate or bandwidth, and the time diversity gain are requested from a receiving apparatus;

determining a number of the parallel signals to correspond to the maximum time diversity gain based on the compared result;

performing time division multiplexing of the determined number of parallel signals;

adjusting a multiplexing ratio according to a channel state and a frequency bandwidth, and performing time division multiplexing of each of the plurality of the demodulated parallel signals to thereby output the multiplexed parallel signals as second serial signals; and transmitting the outputted second serial signals.

9. The transmission method as in any one of claims 6, 7, and 8, wherein the performing of the time division multiplexing comprises:

adjusting a time diversity gain according to channel related information; and adjusting the multiplexing ratio according to the adjusted time diversity gain.

10. A receiving method of a time division multiplexing communication system with a parallel structure, the receiving method comprising:

receiving second serial signals from a transmission apparatus;

performing time division demultiplexing of the received second serial signals in a demultiplexing ratio corresponding to a multiplexing ratio of the transmission apparatus to thereby output the demultiplexed serial signals as a plurality of parallel signals;

respectively demodulating the outputted parallel signals; and performing time division multiplexing of each of the demodulated parallel signals as first serial signals, wherein the received second signal from the transmission apparatus comprises:

performing time division demultiplexing from the inputted first serial signals to thereby output the demultiplexed serial signals as a plurality of parallel signals;

modulating each of the outputted parallel signals, and wherein the performing of the time division multiplexing comprises:

comparing a time diversity gain with a maximum time diversity gain when the time diversity gain is requested from a receiving apparatus;

determining a number of the parallel signals to correspond to the maximum time diversity gain based on the compared result; and performing time division multiplexing of the determined number of parallel signals;

adjusting a multiplexing ratio according to a channel state and a frequency bandwidth, and performing time division multiplexing of each of the plurality of the demodulated parallel signals to thereby output the multiplexed parallel signals as second serial signals; and transmitting the outputted second serial signals as the received second serial signals.

* * * * *